US011196274B2

(12) United States Patent
Ambriz Rios et al.

(10) Patent No.: US 11,196,274 B2
(45) Date of Patent: Dec. 7, 2021

(54) CHARGING CASE ASSEMBLY

(71) Applicant: JUUL Labs, Inc., San Francisco, CA (US)

(72) Inventors: Cesar Ambriz Rios, San Francisco, CA (US); Wei-Ling Chang, San Francisco, CA (US); Brandon Cheung, San Francisco, CA (US); Richard Johnson, San Francisco, CA (US); Nolan Y T Lau, Daly City, CA (US); Kevin Lomeli, San Francisco, CA (US); James Monsees, San Francisco, CA (US); Alexander Ringrose, Oakland, CA (US); Roxolana Wacyk, San Francisco, CA (US)

(73) Assignee: JUUL Labs, Inc., San Francisco, CA (US)

( * ) Notice: Subject to any disclaimer, the term of this patent is extended or adjusted under 35 U.S.C. 154(b) by 322 days.

(21) Appl. No.: 16/258,491

(22) Filed: Jan. 25, 2019

(65) Prior Publication Data

US 2019/0230985 A1   Aug. 1, 2019

Related U.S. Application Data

(60) Provisional application No. 62/622,744, filed on Jan. 26, 2018, provisional application No. 62/697,375, filed on Jul. 12, 2018.

(51) Int. Cl.
*H02J 7/00* (2006.01)
*H02J 7/34* (2006.01)
*A24F 40/95* (2020.01)

(52) U.S. Cl.
CPC .......... *H02J 7/0044* (2013.01); *A24F 40/95* (2020.01); *H02J 7/00* (2013.01); *H02J 7/0045* (2013.01);
(Continued)

(58) Field of Classification Search
CPC .......... A24F 47/008; A24F 9/16; A24F 40/95
See application file for complete search history.

(56) References Cited

U.S. PATENT DOCUMENTS 799,844 A    9/1905  Fuller
1,163,183 A  12/1915  Stoll
(Continued)

FOREIGN PATENT DOCUMENTS

AU    2017202891 B2    5/2019
CN    100381083 C      4/2008
(Continued)

OTHER PUBLICATIONS

Brik—Slimmest Portable JUUL Charging Case by Brik . earliest review date: Jun. 3, 2018. found online [Dec. 20, 2018] https://brikcharger.com/products/brik?gclid=EAlalQobChM175ffobrnv3w1VTlqGCh08BwU6EAQYASABEglWvPDBwE# shopify-product-reviews.
(Continued)

*Primary Examiner* — Jean F Duverne
(74) *Attorney, Agent, or Firm* — Mintz Levin Cohn Ferris Glovsky and Popeo, P.C.

(57) ABSTRACT

A charging case assembly for a vaporizer device includes a lower housing pivotably coupled to an upper housing. The lower housing can include a rechargeable power supply and a coupling mechanism configured to receive and position the vaporizer device within the lower housing. The coupling mechanism can include a cradle portion positioned along the lower housing and further include an elongated base that is recessed along an inner surface of the lower housing. The cradle portion can be configured to receive the vaporizer device such that a first elongated side of the vaporizer device is positioned against the base of the cradle portion. The
(Continued)

coupling mechanism can further include a pair of case contacts positioned adjacent a first end of the base.

28 Claims, 27 Drawing Sheets

(52) U.S. Cl.
CPC ............ *H02J 7/0047* (2013.01); *H02J 7/342* (2020.01); *H02J 7/0048* (2020.01); *H02J 7/0049* (2020.01)

(56) References Cited

U.S. PATENT DOCUMENTS

| | | |
|---|---|---|
| D54,979 S | 4/1920 | Blackmarr |
| 1,505,748 A | 8/1924 | Louis |
| 1,706,244 A | 3/1929 | Louis |
| 1,998,683 A | 4/1935 | Montgomery |
| 2,231,909 A | 2/1941 | Hempal |
| D138,373 S | 7/1944 | Crane |
| D139,041 S | 10/1944 | Morrison |
| D141,079 S | 5/1945 | Bogoff |
| D145,886 S | 11/1946 | Fox |
| D162,809 S | 4/1951 | Gay |
| D194,710 S | 2/1963 | Dreher |
| 3,272,321 A | 9/1966 | Tamarin |
| D209,319 S | 11/1967 | Rappoport |
| D217,385 S | 4/1970 | Rams |
| D223,523 S | 4/1972 | Kastner |
| D226,128 S | 1/1973 | Rams |
| D228,307 S | 9/1973 | Rams |
| D233,612 S | 11/1974 | Moriya |
| D233,686 S | 11/1974 | Stutzer |
| D236,280 S | 8/1975 | Ohsiswa |
| D242,811 S | 12/1976 | Stuetzer et al. |
| D246,473 S | 11/1977 | Stutzer et al. |
| D248,244 S | 6/1978 | Beleckis |
| D252,768 S | 8/1979 | Brand |
| 4,207,976 A | 6/1980 | Herman |
| D259,741 S | 6/1981 | Stuetzer |
| D284,113 S | 6/1986 | Wassmann |
| 4,798,310 A | 1/1989 | Kasai et al. |
| D314,914 S | 2/1991 | Callinan |
| D332,324 S | 1/1993 | Howey, Jr. |
| D335,194 S | 4/1993 | Bruzzi |
| D335,575 S | 5/1993 | Suwa |
| D352,601 S | 11/1994 | Dallaire |
| D366,950 S | 2/1996 | McKinnie |
| D379,010 S | 4/1997 | Digianni |
| D379,552 S | 5/1997 | Vokebe |
| D379,553 S | 5/1997 | DiGianni |
| D380,063 S | 6/1997 | Digianni |
| D384,821 S | 10/1997 | Sugar |
| D384,822 S | 10/1997 | Sugar et al. |
| D385,653 S | 10/1997 | Wicker |
| D398,715 S | 9/1998 | Descalzo |
| D409,329 S | 5/1999 | Bucher et al. |
| D410,764 S | 6/1999 | Wilson |
| D411,332 S | 6/1999 | Zelenik |
| D414,891 S | 10/1999 | Schmaling et al. |
| 5,967,310 A | 10/1999 | Hill |
| D416,105 S | 11/1999 | Garrison et al. |
| D466,643 S | 12/2002 | Harel |
| 6,726,006 B1 | 4/2004 | Funderburk et al. |
| D498,330 S | 11/2004 | Koike |
| D499,205 S | 11/2004 | Wong |
| D514,741 S | 2/2006 | Cohen Harel |
| D527,182 S | 8/2006 | Ham |
| D536,480 S | 2/2007 | Park |
| D595,454 S | 6/2009 | Fuente |
| D596,350 S | 7/2009 | Fuente |
| D596,788 S | 7/2009 | Fuente |
| D605,350 S | 12/2009 | Smith |
| D612,094 S | 3/2010 | Bellamah et al. |
| D617,042 S | 6/2010 | Wong |
| D622,902 S | 8/2010 | An |
| D625,466 S | 10/2010 | Martin |
| D626,688 S | 11/2010 | Gibson et al. |
| D649,236 S | 11/2011 | Bilko et al. |
| D656,093 S | 3/2012 | Nomi et al. |
| D656,496 S | 3/2012 | Andre et al. |
| D663,520 S | 7/2012 | Antler |
| D664,636 S | 7/2012 | Robinson et al. |
| D666,811 S | 9/2012 | Yang |
| 8,365,742 B2 | 2/2013 | Hon |
| D681,268 S | 4/2013 | Wu |
| D681,875 S | 5/2013 | Park |
| D689,818 S | 9/2013 | Sasada |
| D692,177 S | 10/2013 | Angiolillo |
| D692,615 S | 10/2013 | Verleur |
| D693,054 S | 11/2013 | Verleur |
| D697,715 S | 1/2014 | Dietrich |
| D706,129 S | 6/2014 | Boraczek et al. |
| 8,794,244 B2 | 8/2014 | Hammel et al. |
| D715,051 S | 10/2014 | Tung et al. |
| D718,723 S | 12/2014 | Clymer et al. |
| D719,701 S | 12/2014 | Scatterday |
| 8,910,783 B2 | 12/2014 | Liu |
| D722,870 S | 2/2015 | Fohner et al. |
| D723,735 S | 3/2015 | Liu |
| D725,823 S | 3/2015 | Scatterday et al. |
| 8,967,382 B2 | 3/2015 | Liu |
| 8,973,587 B2 | 3/2015 | Liu |
| 8,978,663 B2 | 3/2015 | Newton |
| D733,278 S | 6/2015 | Newlin |
| 9,078,472 B2 | 7/2015 | Liu |
| 9,089,166 B1 | 7/2015 | Scatterday |
| D735,476 S | 8/2015 | Duvigneau |
| D735,572 S | 8/2015 | Fath et al. |
| D735,937 S | 8/2015 | Liu |
| 9,155,336 B2 | 10/2015 | Liu |
| 9,198,464 B2 | 12/2015 | Liu |
| D747,793 S | 1/2016 | Wright |
| D748,325 S | 1/2016 | Leidel |
| 9,226,526 B2 | 1/2016 | Liu |
| 9,240,697 B2 | 1/2016 | Xiang |
| D751,251 S | 3/2016 | Fath et al. |
| D751,756 S | 3/2016 | Hearn |
| D752,285 S | 3/2016 | Doster |
| D752,808 S | 3/2016 | Hearn |
| 9,271,525 B2 | 3/2016 | Liu |
| 9,271,526 B2 | 3/2016 | Liu |
| 9,281,705 B2 | 3/2016 | Xiang |
| D754,913 S | 4/2016 | Almsberger et al. |
| D754,920 S | 4/2016 | Domon |
| 9,302,825 B2 | 4/2016 | Liu |
| 9,350,178 B2 | 5/2016 | Xiang |
| 9,350,181 B2 | 5/2016 | Xiang |
| D758,655 S | 6/2016 | Freshwater et al. |
| D758,656 S | 6/2016 | Freshwater et al. |
| D760,431 S | 6/2016 | Liu |
| 9,357,802 B2 | 6/2016 | Liu |
| 9,385,554 B2 | 7/2016 | Xiang |
| 9,413,180 B2 | 8/2016 | Liu |
| 9,427,024 B2 | 8/2016 | Liu |
| 9,438,049 B2 | 9/2016 | Xiang |
| 9,455,579 B2 | 9/2016 | Xiang |
| D768,918 S | 10/2016 | Ward et al. |
| D769,521 S | 10/2016 | Lin |
| D770,679 S | 11/2016 | Weigensberg |
| D770,680 S | 11/2016 | Bennett et al. |
| D772,480 S | 11/2016 | Hua |
| D773,116 S | 11/2016 | Liu et al. |
| 9,497,999 B2 | 11/2016 | Lord |
| 9,502,917 B2 | 11/2016 | Xiang |
| 9,504,278 B2 | 11/2016 | Liu |
| D776,340 S | 1/2017 | Seibel et al. |
| D779,726 S | 2/2017 | Bennett et al. |
| D780,373 S | 2/2017 | Bennett et al. |
| 9,642,396 B2 | 5/2017 | Liu |
| 9,655,383 B2 | 5/2017 | Holzherr et al. |
| D789,599 S | 6/2017 | Kesselman et al. |
| D790,129 S | 6/2017 | Bennett et al. |
| 9,668,518 B2 | 6/2017 | Esses |

(56) References Cited

U.S. PATENT DOCUMENTS

| | | |
|---|---|---|
| 9,668,522 B2 | 6/2017 | Memari et al. |
| D791,070 S | 7/2017 | Son et al. |
| D793,004 S | 7/2017 | Liu |
| D796,658 S | 9/2017 | Wu |
| D800,380 S | 10/2017 | Williams et al. |
| 9,775,380 B2 | 10/2017 | Fernando et al. |
| 9,801,414 B2 | 10/2017 | Liu |
| 9,806,549 B2 | 10/2017 | Liberti et al. |
| D802,834 S | 11/2017 | Mathias et al. |
| D806,312 S | 12/2017 | Leon |
| 9,841,433 B2 | 12/2017 | Norris et al. |
| D807,818 S | 1/2018 | Mathias et al. |
| D807,839 S | 1/2018 | Vijayan |
| D809,706 S | 2/2018 | Martin |
| D811,005 S | 2/2018 | Fath et al. |
| D812,289 S | 3/2018 | Ward et al. |
| D812,290 S | 3/2018 | Ward et al. |
| D815,343 S | 4/2018 | Kesselman |
| D815,346 S | 4/2018 | Bagai |
| D818,195 S | 5/2018 | Burger |
| D818,640 S | 5/2018 | Kakoun |
| 9,985,455 B2 | 5/2018 | Alarcon et al. |
| D819,882 S | 6/2018 | Qiu |
| D820,688 S | 6/2018 | Fath |
| D824,094 S | 7/2018 | Rein |
| D825,102 S | 8/2018 | Bowen et al. |
| 10,058,124 B2 | 8/2018 | Monsees et al. |
| 10,058,128 B2 | 8/2018 | Cameron et al. |
| D828,621 S | 9/2018 | Qiu |
| D828,953 S | 9/2018 | Chen |
| D829,375 S | 9/2018 | Huang et al. |
| 10,069,320 B2 | 9/2018 | Cai et al. |
| D829,981 S | 10/2018 | Chen et al. |
| D829,982 S | 10/2018 | Wang |
| D829,983 S | 10/2018 | Wang |
| D830,626 S | 10/2018 | Gu |
| D832,504 S | 10/2018 | Qiu |
| D832,505 S | 10/2018 | Bennett et al. |
| 10,090,693 B2 | 10/2018 | Alarcon |
| D833,671 S | 11/2018 | Stephane |
| D833,672 S | 11/2018 | Qiu |
| 10,131,532 B2 | 11/2018 | Murison et al. |
| D835,840 S | 12/2018 | Liu et al. |
| D836,832 S | 12/2018 | Kesselman et al. |
| 10,194,689 B2 | 2/2019 | Schennum et al. |
| D842,237 S | 3/2019 | Qiu et al. |
| D842,238 S | 3/2019 | Qiu et al. |
| D842,243 S | 3/2019 | Qiu |
| D843,052 S | 3/2019 | Powell et al. |
| D844,232 S | 3/2019 | Qiu |
| D846,186 S | 4/2019 | Singh |
| 10,278,424 B2 | 5/2019 | Garthaffner et al. |
| D850,713 S | 6/2019 | Northern |
| D853,022 S | 7/2019 | Srour |
| D853,023 S | 7/2019 | Bailey et al. |
| D855,880 S | 8/2019 | Sarsurluoglu |
| D860,523 S | 9/2019 | Cheung et al. |
| D863,677 S | 10/2019 | Chung et al. |
| D870,367 S | 12/2019 | Chung et al. |
| D870,960 S | 12/2019 | Luxton |
| D871,667 S | 12/2019 | Ayalon et al. |
| D876,008 S | 2/2020 | Cheung et al. |
| D889,035 S | 6/2020 | Cheung et al. |
| D889,739 S | 7/2020 | Ringrose et al. |
| D905,601 S | 12/2020 | Cheung et al. |
| 10,918,179 B2 | 2/2021 | Fernando et al. |
| 2002/0088469 A1 | 7/2002 | Rennecamp |
| 2009/0014019 A1 | 1/2009 | Park |
| 2009/0283103 A1 | 11/2009 | Nielsen et al. |
| 2010/0301032 A1 | 12/2010 | Johnson |
| 2010/0307518 A1 | 12/2010 | Wang |
| 2010/0313901 A1 | 12/2010 | Fernando et al. |
| 2011/0120482 A1 | 5/2011 | Brenneise |
| 2011/0265806 A1 | 11/2011 | Alarcon et al. |
| 2012/0103842 A1 | 5/2012 | Koester |
| 2012/0227753 A1 | 9/2012 | Newton |
| 2013/0146489 A1 | 6/2013 | Scatterday |
| 2013/0220847 A1 | 8/2013 | Fisher et al. |
| 2013/0336358 A1 | 12/2013 | Liu |
| 2013/0342157 A1 | 12/2013 | Liu |
| 2014/0002004 A1 | 1/2014 | Farris-Gilbert et al. |
| 2014/0007892 A1 | 1/2014 | Liu |
| 2014/0020697 A1 | 1/2014 | Liu |
| 2014/0041655 A1 | 2/2014 | Barron et al. |
| 2014/0053856 A1 | 2/2014 | Liu |
| 2014/0053858 A1 | 2/2014 | Liu |
| 2014/0130797 A1 | 5/2014 | Liu |
| 2014/0161301 A1 | 6/2014 | Merenda |
| 2014/0224267 A1 | 8/2014 | Levitz et al. |
| 2014/0262871 A1 | 9/2014 | Fath |
| 2015/0034057 A1 | 2/2015 | Liu |
| 2015/0041482 A1 | 2/2015 | Liu |
| 2015/0053217 A1* | 2/2015 | Steingraber ............ A24F 40/60 131/329 |
| 2015/0059779 A1 | 3/2015 | Alarcon et al. |
| 2015/0100441 A1 | 4/2015 | Alarcon et al. |
| 2015/0101945 A1 | 4/2015 | Scatterday |
| 2015/0102777 A1 | 4/2015 | Cooper |
| 2015/0114410 A1 | 4/2015 | Doster |
| 2015/0136158 A1 | 5/2015 | Stevens et al. |
| 2015/0164138 A1 | 6/2015 | Liu |
| 2015/0201676 A1 | 7/2015 | Shin |
| 2015/0237918 A1 | 8/2015 | Liu |
| 2015/0245654 A1 | 9/2015 | Memari et al. |
| 2015/0305464 A1 | 10/2015 | Nelson, Jr. et al. |
| 2015/0327596 A1 | 11/2015 | Alarcon et al. |
| 2015/0332379 A1 | 11/2015 | Alarcon |
| 2015/0333561 A1 | 11/2015 | Alarcon |
| 2015/0342252 A1 | 12/2015 | Fath |
| 2016/0087469 A1 | 3/2016 | Armstrong |
| 2016/0091194 A1 | 3/2016 | Liu |
| 2016/0095353 A1 | 4/2016 | Liu |
| 2016/0096658 A1 | 4/2016 | Fath |
| 2016/0099592 A1 | 4/2016 | Gatta et al. |
| 2016/0101909 A1 | 4/2016 | Schennum et al. |
| 2016/0113323 A1 | 4/2016 | Liu |
| 2016/0120218 A1 | 5/2016 | Schennum et al. |
| 2016/0134143 A1 | 5/2016 | Liu |
| 2016/0143357 A1 | 5/2016 | Liu |
| 2016/0165952 A1 | 6/2016 | Liu |
| 2016/0198766 A1 | 7/2016 | Liu |
| 2016/0204637 A1 | 7/2016 | Alarcon et al. |
| 2016/0206000 A1 | 7/2016 | Lord et al. |
| 2016/0226286 A1 | 8/2016 | Xiang |
| 2016/0233705 A1 | 8/2016 | Liu |
| 2016/0233708 A1 | 8/2016 | Liu |
| 2016/0235119 A1 | 8/2016 | Liu |
| 2016/0249680 A1 | 9/2016 | Liu |
| 2016/0268824 A1 | 9/2016 | Liu |
| 2016/0278431 A1 | 9/2016 | Liu |
| 2016/0278433 A1 | 9/2016 | Xiang |
| 2016/0278436 A1 | 9/2016 | Verleur et al. |
| 2016/0286865 A1 | 10/2016 | King et al. |
| 2016/0297341 A1 | 10/2016 | Wallace et al. |
| 2016/0309779 A1 | 10/2016 | Liu |
| 2016/0316818 A1 | 11/2016 | Liu |
| 2016/0316822 A1 | 11/2016 | Liu |
| 2016/0324217 A1 | 11/2016 | Cameron |
| 2016/0331034 A1 | 11/2016 | Cameron |
| 2016/0345628 A1 | 12/2016 | Sabet |
| 2016/0366933 A1 | 12/2016 | Liu |
| 2016/0374390 A1 | 12/2016 | Liu |
| 2016/0374392 A1 | 12/2016 | Liu |
| 2016/0374397 A1 | 12/2016 | Jordan et al. |
| 2017/0013875 A1 | 1/2017 | Schennum et al. |
| 2017/0027221 A1 | 2/2017 | Liu |
| 2017/0045994 A1 | 2/2017 | Murison et al. |
| 2017/0050798 A1 | 2/2017 | Ludewig et al. |
| 2017/0071257 A1 | 3/2017 | Lin |
| 2017/0079323 A1 | 3/2017 | Wang |
| 2017/0079327 A1 | 3/2017 | Wu et al. |
| 2017/0086503 A1 | 3/2017 | Cameron |
| 2017/0099878 A1* | 4/2017 | Murison ............... A24F 15/015 |
| 2017/0101256 A1 | 4/2017 | Zeitlin et al. |

(56) References Cited

U.S. PATENT DOCUMENTS

| | | |
|---|---|---|
| 2017/0119044 A1 | 5/2017 | Oligschlaeger et al. |
| 2017/0150758 A1 | 6/2017 | Fernando et al. |
| 2017/0181471 A1 | 6/2017 | Phillips et al. |
| 2017/0196270 A1 | 7/2017 | Vick et al. |
| 2017/0207499 A1 | 7/2017 | Leadley |
| 2017/0208862 A1 | 7/2017 | Li et al. |
| 2017/0208865 A1* | 7/2017 | Nettenstrom ........... A24F 40/95 |
| 2017/0214261 A1 | 7/2017 | Gratton |
| 2017/0215484 A1 | 8/2017 | Xiang |
| 2017/0222468 A1 | 8/2017 | Schennum et al. |
| 2017/0238596 A1 | 8/2017 | Matsumoto et al. |
| 2017/0273357 A1 | 9/2017 | Barbuck |
| 2017/0290371 A1 | 10/2017 | Davis et al. |
| 2017/0302089 A1 | 10/2017 | Bernauer et al. |
| 2017/0302324 A1 | 10/2017 | Stanimirovic et al. |
| 2017/0325289 A1 | 11/2017 | Liu |
| 2017/0334605 A1 | 11/2017 | Murphy et al. |
| 2017/0354183 A1 | 12/2017 | Liu |
| 2018/0027878 A1 | 2/2018 | Dendy et al. |
| 2018/0084828 A1 | 3/2018 | Phillips et al. |
| 2018/0141714 A1 | 5/2018 | Kanbar et al. |
| 2018/0160739 A1 | 6/2018 | Chen |
| 2018/0289069 A1 | 10/2018 | Reevell |
| 2019/0029324 A1 | 1/2019 | Liu |
| 2019/0069601 A1 | 3/2019 | Qiu |
| 2019/0158938 A1 | 5/2019 | Bowen et al. |
| 2019/0159519 A1 | 5/2019 | Bowen et al. |
| 2020/0000146 A1 | 1/2020 | Anderson et al. |

FOREIGN PATENT DOCUMENTS

| | | |
|---|---|---|
| CN | 101869356 A | 10/2010 |
| CN | 303210084 | 5/2015 |
| CN | 106136324 A | 11/2016 |
| CN | 304067429 | 3/2017 |
| CN | 104049550 B | 9/2017 |
| CN | 207265866 U | 4/2018 |
| EP | 2573900 A1 | 3/2013 |
| EP | 3007305 A1 | 4/2016 |
| EP | 3026779 A1 | 6/2016 |
| EP | 3031338 A1 | 6/2016 |
| EP | 3143882 A2 | 3/2017 |
| EP | 3294077 B1 | 3/2019 |
| EP | 3326473 B1 | 11/2020 |
| JP | D1463338 | 3/2013 |
| KR | 3005136090000 | 12/2008 |
| KR | 20090008914 U | 9/2009 |
| KR | 101357574 B1 | 2/2014 |
| KR | 3008201020001 | 10/2015 |
| WO | WO-2014117382 A1 | 8/2014 |
| WO | WO-2014185937 A1 | 11/2014 |
| WO | WO-2014194499 A1 | 12/2014 |
| WO | WO-2015015156 A1 | 2/2015 |
| WO | WO-2015054961 A1 | 4/2015 |
| WO | WO-2015058367 A1 | 4/2015 |
| WO | WO-2015137815 A1 | 9/2015 |
| WO | WO-2015174657 A1 | 11/2015 |
| WO | WO-2015196395 A1 | 12/2015 |
| WO | WO-2016000207 A1 | 1/2016 |
| WO | WO-2016058189 A1 | 4/2016 |
| WO | WO-2016106483 A1 | 7/2016 |
| WO | WO-2016149942 A1 | 9/2016 |
| WO | WO-2017084920 A2 | 5/2017 |
| WO | WO-2017141358 A1 | 8/2017 |
| WO | WO-2017173947 A1 | 10/2017 |

OTHER PUBLICATIONS

JUUL Portable Charging Case . earliest review dated May 29, 2019. found online [Jun. 14, 2019] https://www.juul.com/shop/accessories/_portable-charging-case.

* cited by examiner

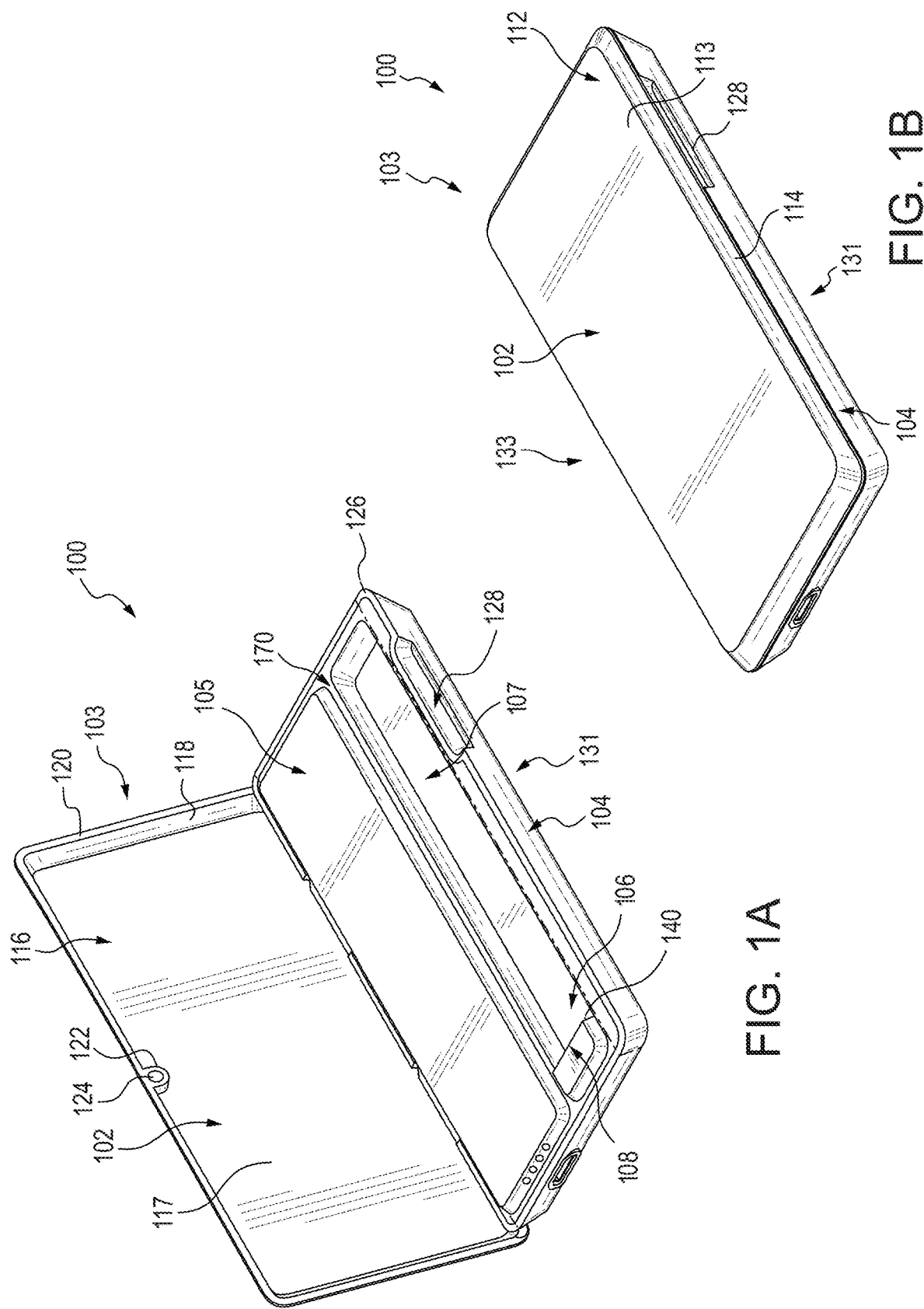

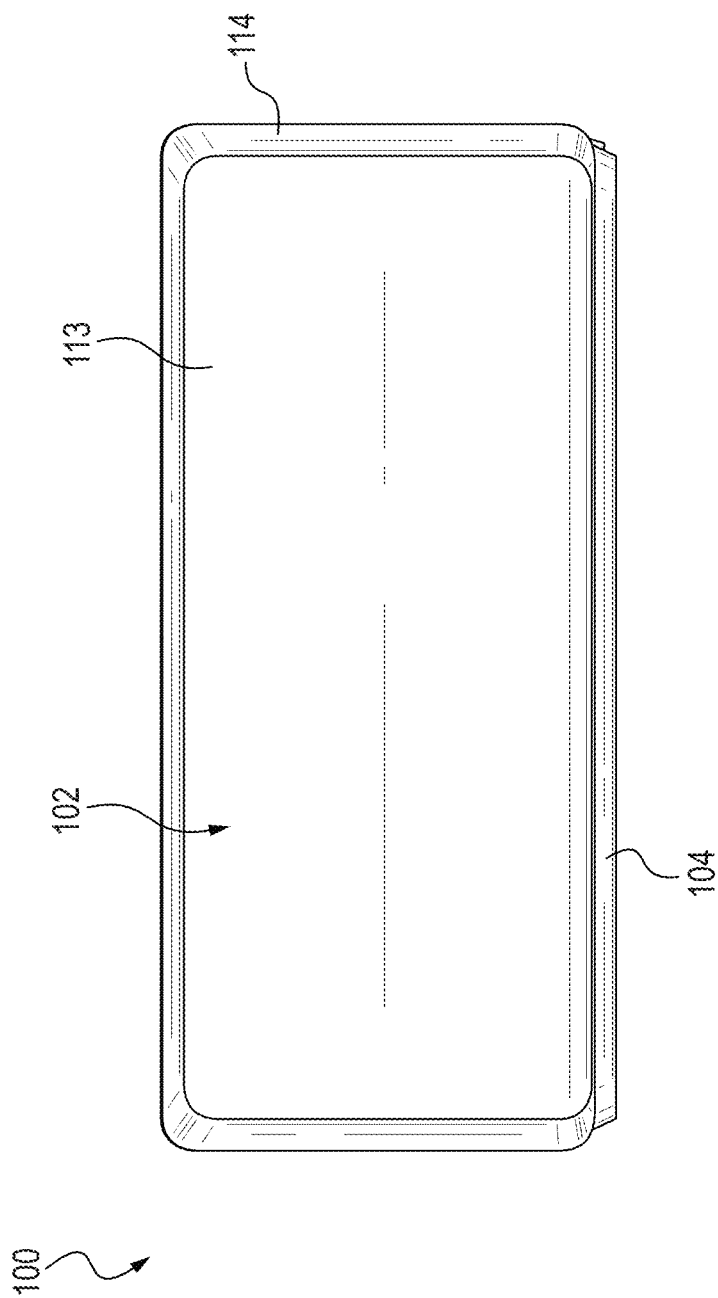

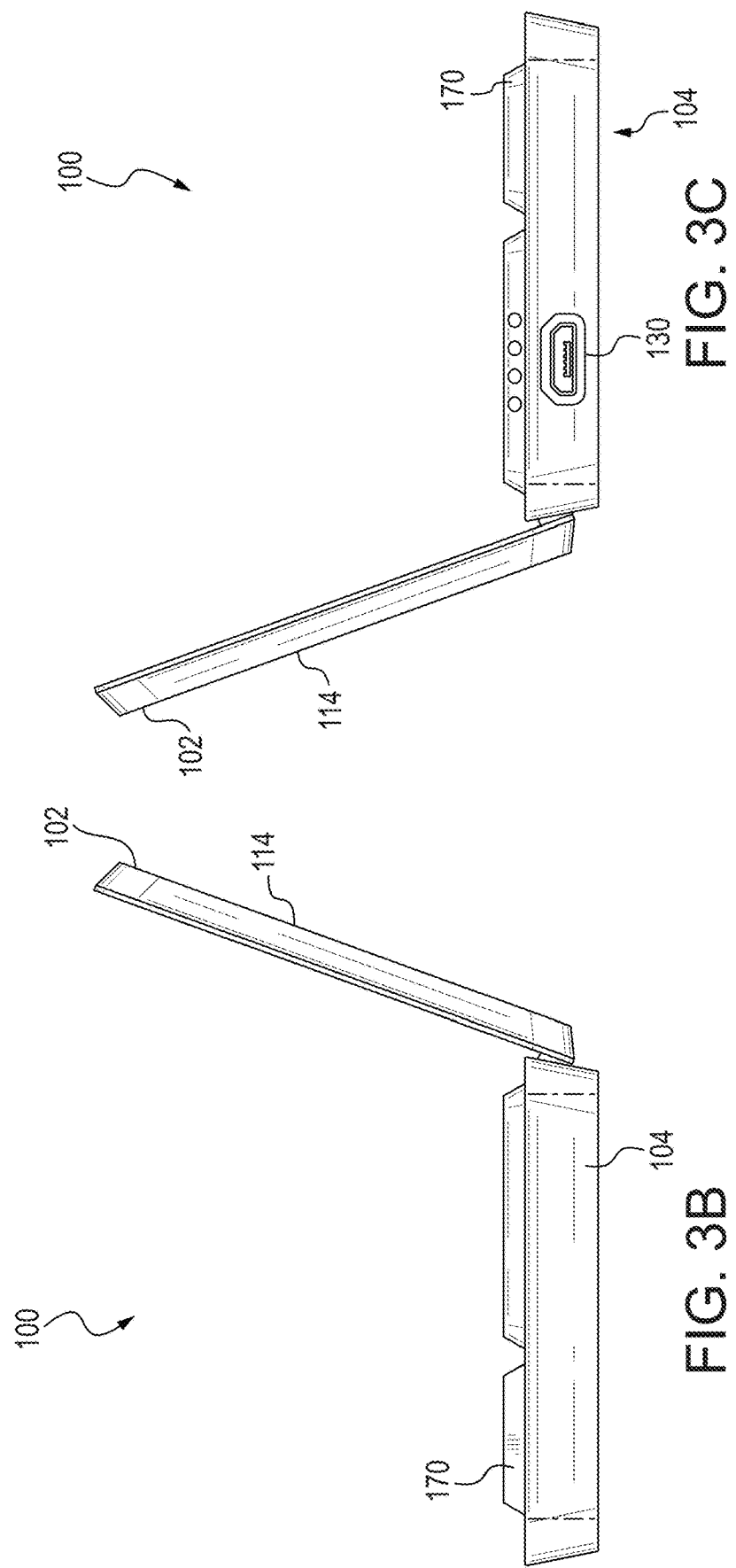

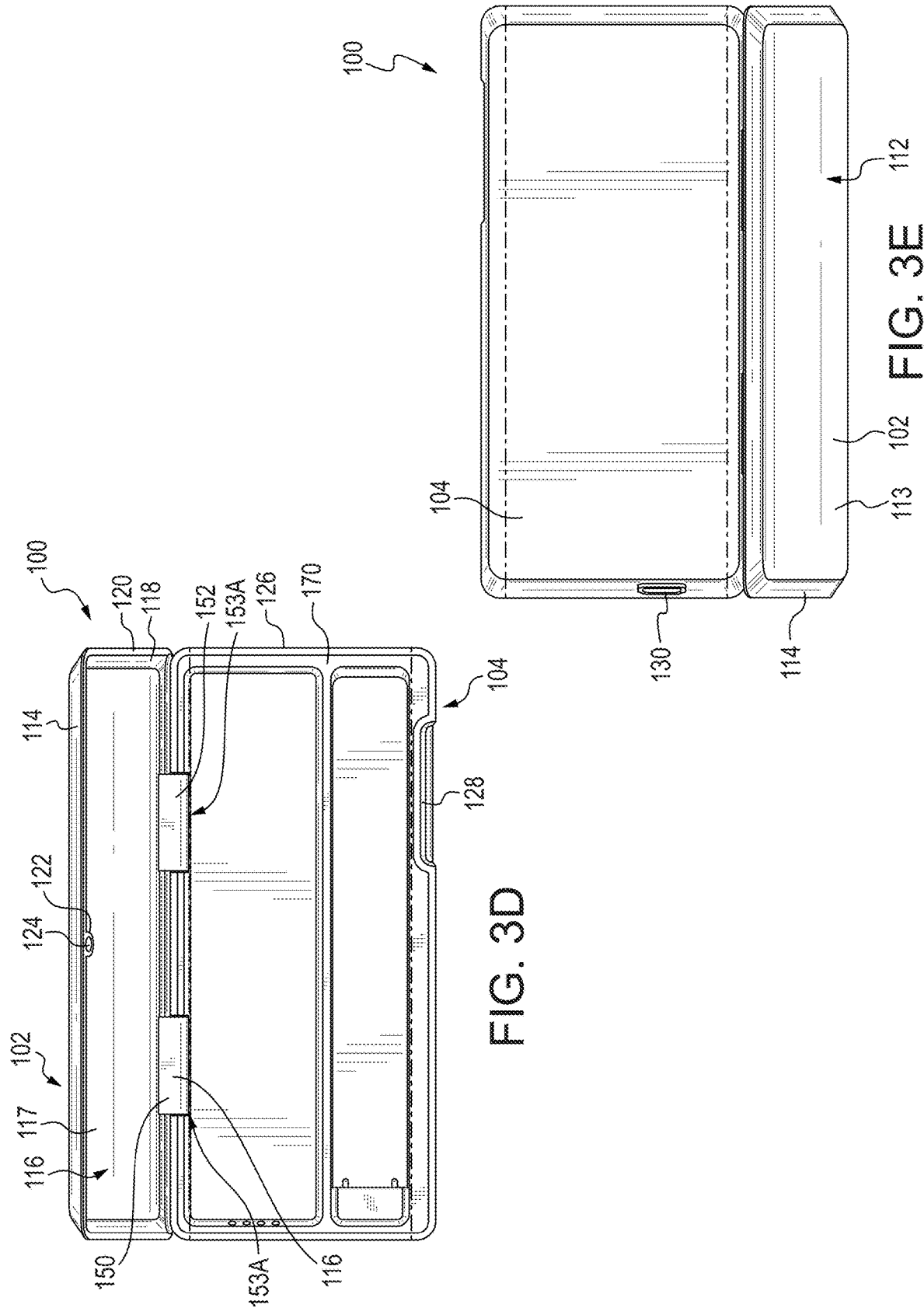

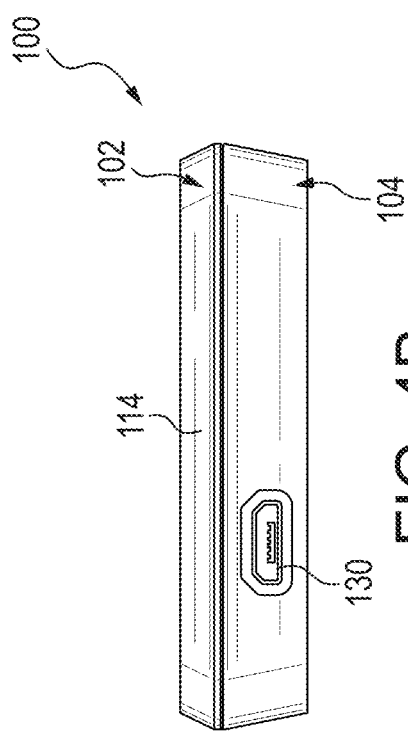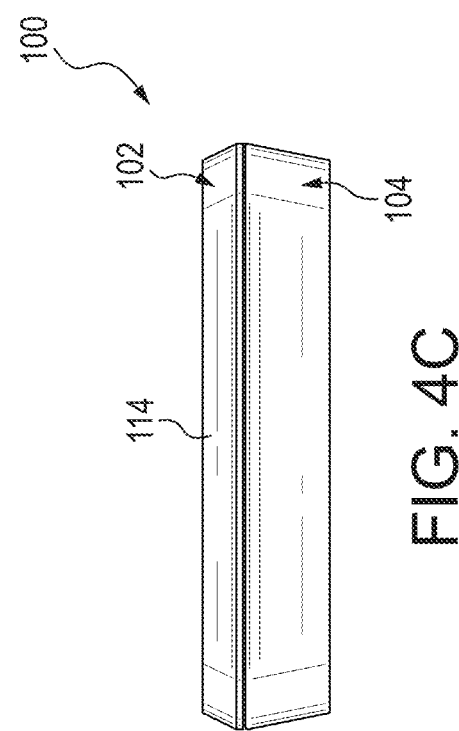

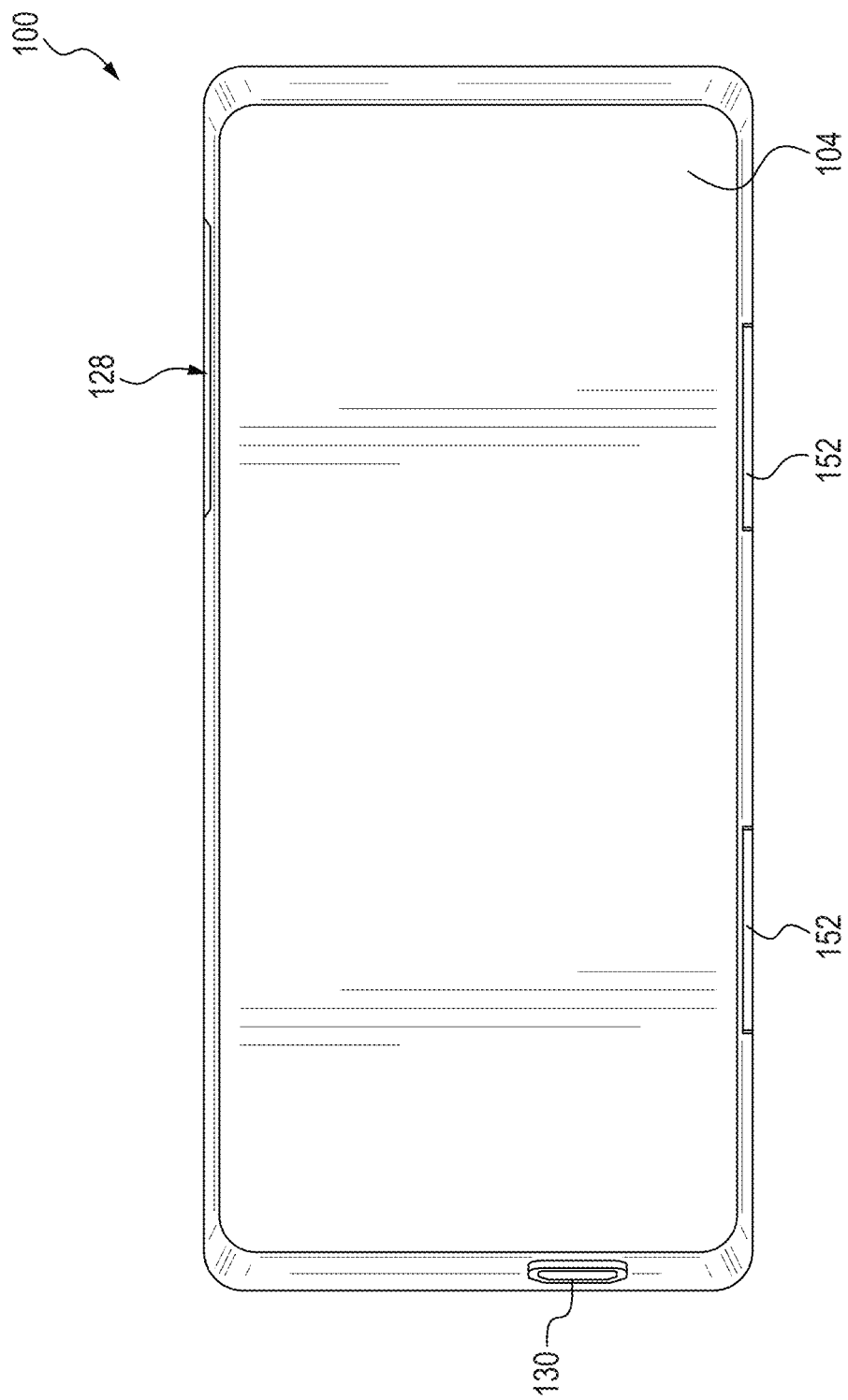

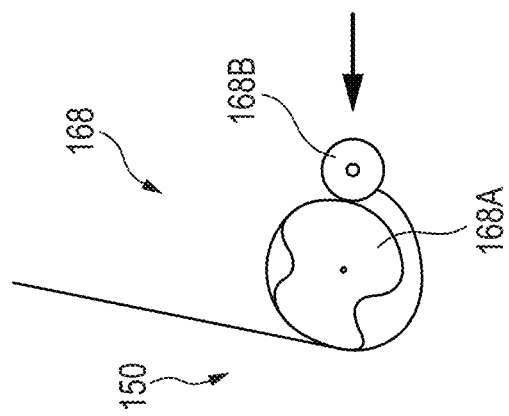
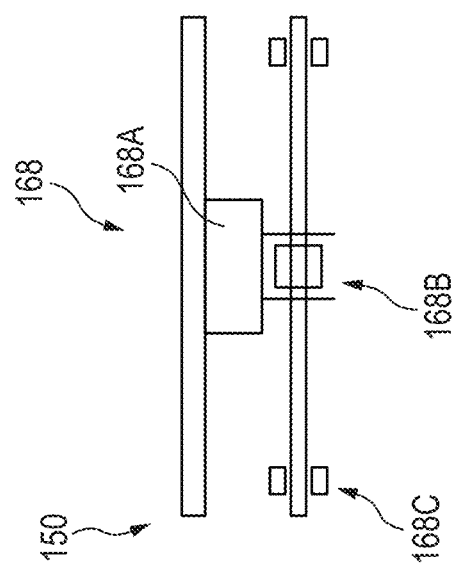
FIG. 5G

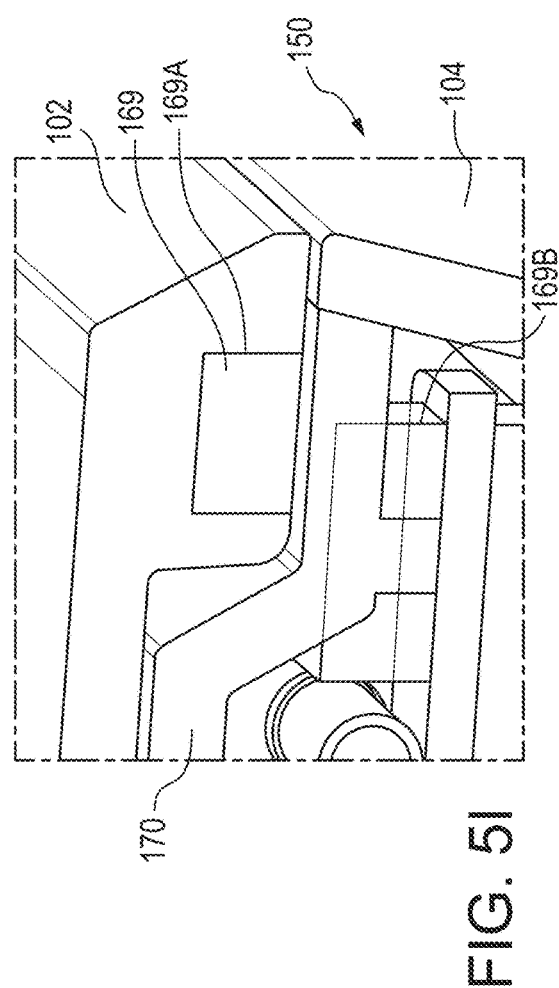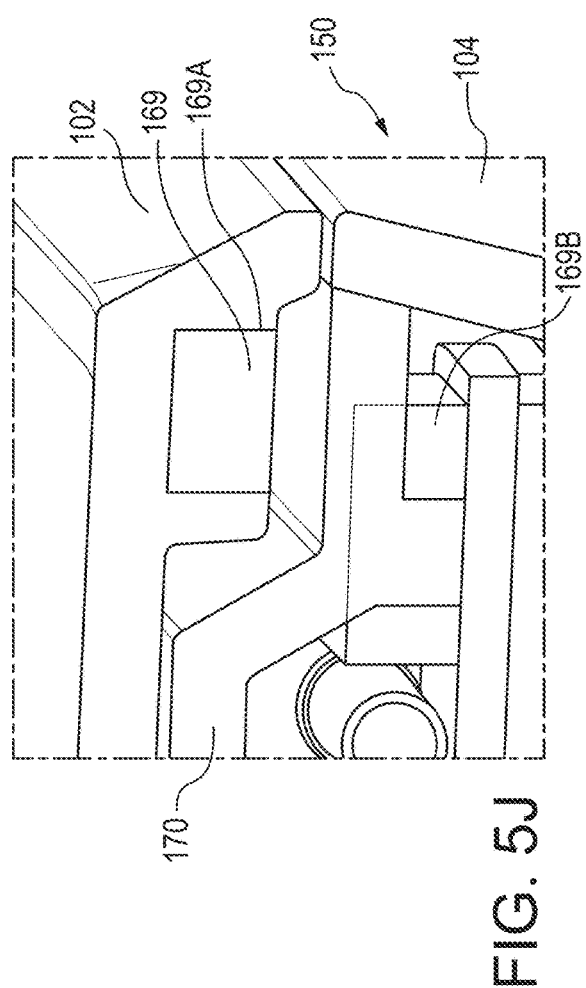

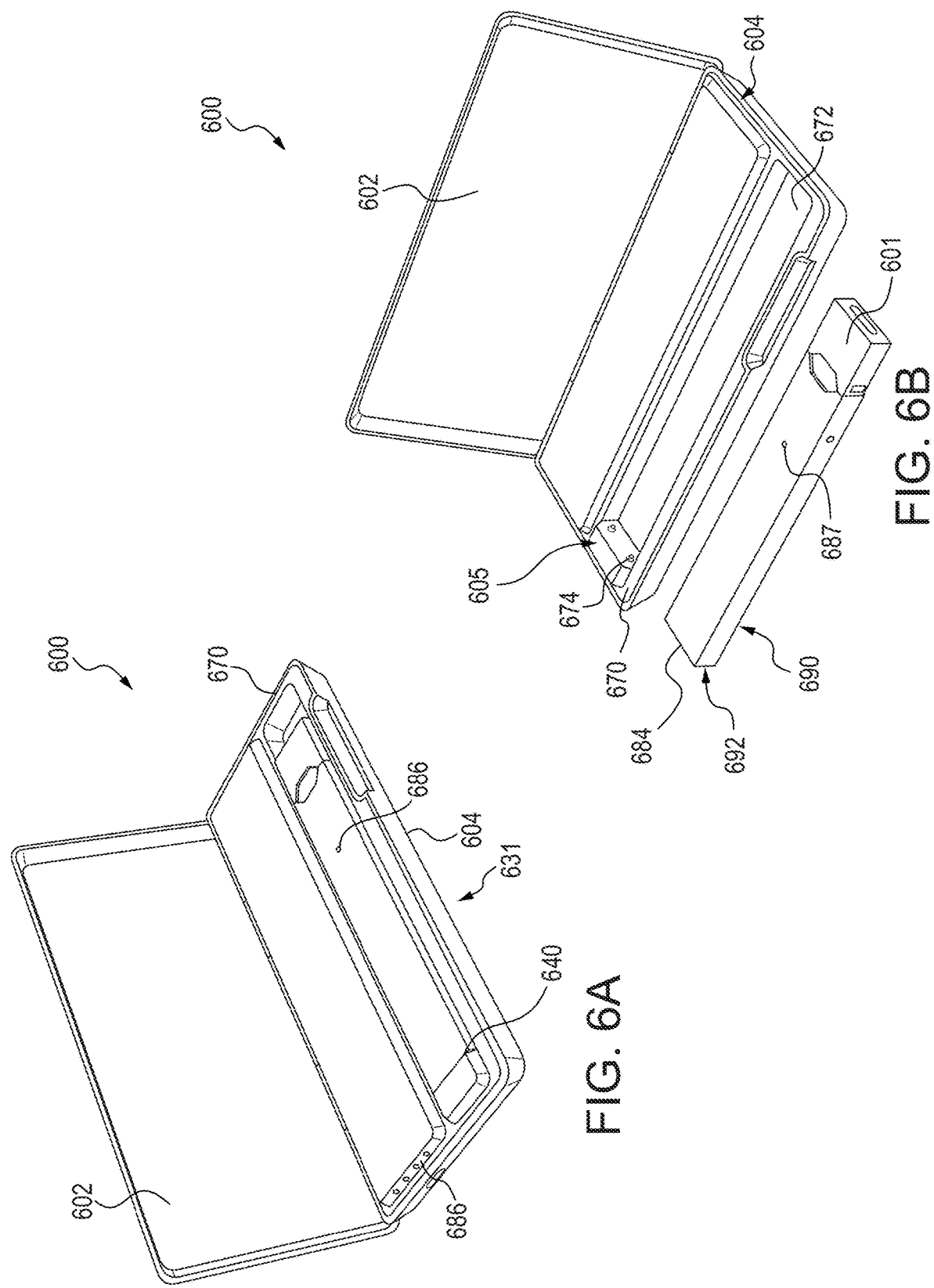

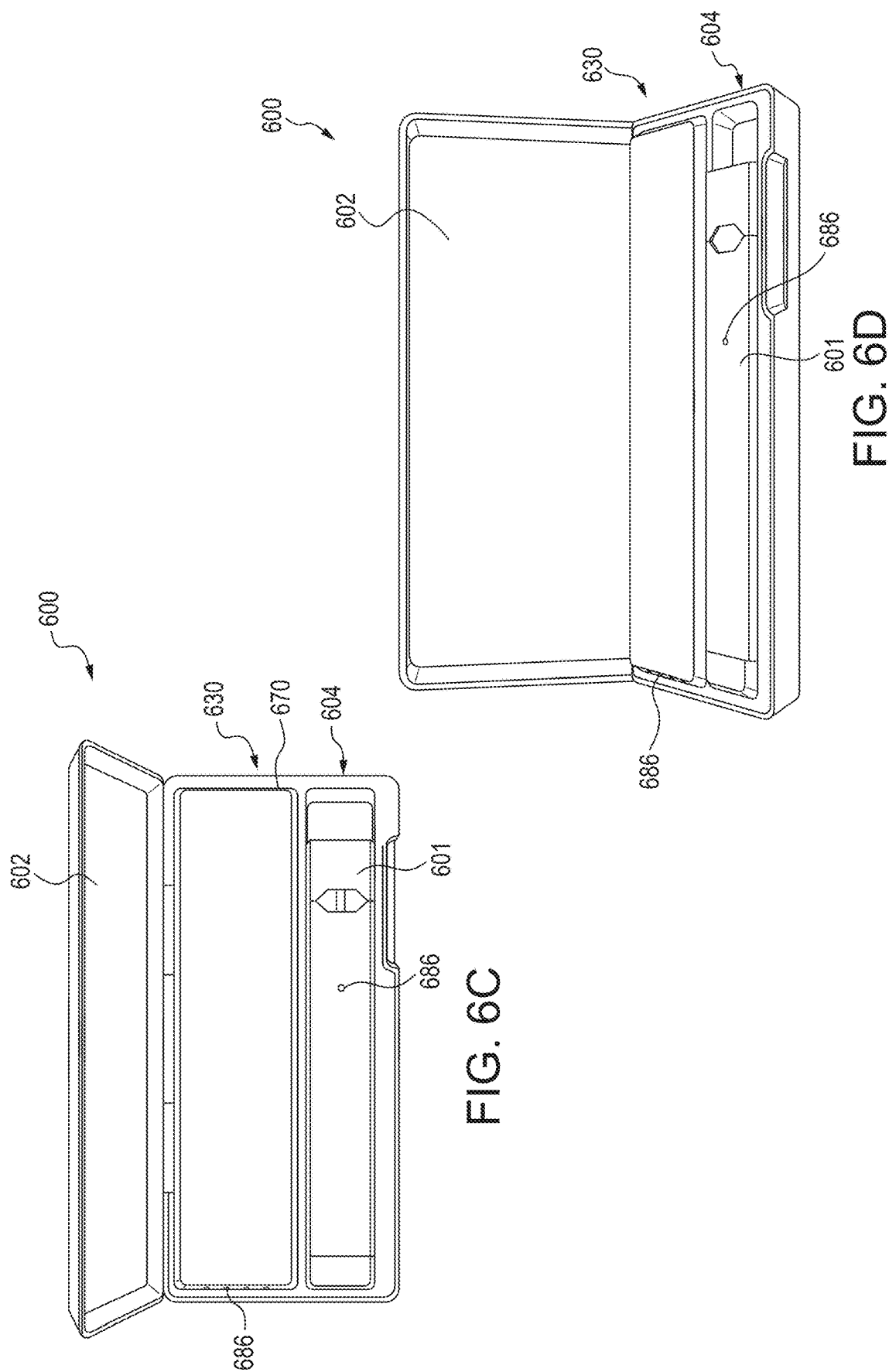

CHARGING CASE ASSEMBLY

CROSS REFERENCE TO RELATED APPLICATIONS

This application claims priority to U.S. Application No. 62/622,744, filed Jan. 26, 2018, entitled "CHARGING CASE ASSEMBLY," and U.S. Application No. 62/697,375, filed Jul. 12, 2018, entitled "CHARGING CASE ASSEMBLY," the contents of which are hereby incorporated by reference in their entirety.

BACKGROUND

Vaporizing devices, including electronic vaporizers or e-vaporizer devices, allow the delivery of vapor containing one or more active ingredients by inhalation of the vapor. Electronic vaporizer devices are gaining increasing popularity both for prescriptive medical use, in delivering medicaments, and for consumption of tobacco and other plant-based smokeable materials, such as *cannabis*, including solid (e.g., loose-leaf) materials, solid/liquid (e.g., suspensions, liquid-coated) materials, wax extracts, and prefilled pods (cartridges, wrapped containers, etc.) of such materials. Electronic vaporizer devices in particular may be portable, self-contained, and convenient for use and can include a rechargeable power supply.

SUMMARY

Aspects of the current subject matter relate to various embodiments of a vaporizer charging case system including a charging case assembly that may secure and charge a vaporizer device. In one aspect, the charging case assembly may include an upper housing and a lower housing pivotably coupled to the upper housing. The lower housing may include a rechargeable power supply configured to be recharged and to provide power to the vaporizer device. The lower housing may also include a coupling mechanism configured to receive and position the vaporizer device within the lower housing. The coupling mechanism may include a cradle portion positioned along the lower housing and may include an elongated base that may be recessed along an inner surface of the lower housing. The cradle portion may be configured to receive the vaporizer device such that a first elongated side of the vaporizer device may be positioned against the base of the cradle portion. A pair of case contacts may be positioned adjacent a first end of the base.

In some variations one or more of the following features can optionally be included in any feasible combination. For example, the base may be recessed a first distance from the inner surface of the lower housing. The first distance may be approximately equivalent to a thickness of the vaporizer device. The cradle portion may include a pair of elongated sidewalls extending approximately parallel to each other along opposing sides of the base and a pair of end walls extending between the pair of elongated sidewalls. The pair of case contacts may be positioned along a first end wall of the pair of end walls.

In some embodiments, the coupling mechanism may include a first magnet positioned adjacent the pair of case contacts. The first magnet may be configured to magnetically couple with a second magnet associated with the vaporizer device to assist with coupling the pair of case contacts with a pair of device contacts associated with the vaporizer device.

In some embodiments, the pair of elongated sidewalls may be positioned a second distance apart. The second distance may be approximately equivalent to a width of the vaporizer device. The second distance may be sized to allow a sliding fit between the vaporizer device and the pair of elongated sidewalls.

In some embodiments, the coupling mechanism may be configured to receive the vaporizer device in more than one orientation.

In some embodiments, the upper housing and the lower housing may be pivotably coupled by a hinge assembly that allows the charging case assembly to form an open configuration, where the upper housing may be pivoted away from the lower housing, and a closed configuration, where the upper housing may be pivoted towards the lower housing. At least one of the upper housing and the lower housing may include a transparent material allowing visualization of an illuminating device indicator along the vaporizer device when the illuminating device indicator is illuminated and the charging case assembly is in the closed configuration.

In some embodiments, the inner surface of the lower housing may include at least one illuminating case indicator for indicating one or more of a charging level and a charging state of either the charging case assembly or the vaporizer device. At least one of the upper housing and the lower housing may include a transparent material allowing visualization of the at least one illuminating case indicator when illuminated and when the charging case assembly is in the closed configuration. The lower housing may further include a switch configured to activate one or more of the at least one illuminating case indicator when the charging case assembly is moved between the closed configuration and the open configuration.

In another interrelated aspect of the current subject matter, a method of charging a vaporizer device may include receiving the vaporizer device in a coupling mechanism of a charging case assembly. The charging case assembly may have an upper housing that may be pivotably coupled to a lower housing for allowing the charging case assembly to transition between an open configuration and a closed configuration. The coupling mechanism may include a cradle portion positioned along the lower housing and may include an elongated base that may be recessed along an inner surface of the lower housing. The cradle portion may be configured to receive the vaporizer device such that a first elongated side of the vaporizer device is positioned against the base of the cradle portion. A pair of case contacts may be positioned adjacent a first end of the base.

The method of charging a vaporizer device may include magnetically coupling a first magnet associated with the lower housing with a second magnet associated with the vaporizer device to assist with coupling the pair of case contacts with a pair of device contacts of the vaporizer device. The method may further include indicating at least one of a charging state and a charging level of the vaporizer device or the charging case assembly. The indicating may include illuminating at least one illuminated indicator associated with the charging case assembly or the vaporizer device. The at least one illuminated indicator may be viewable through the upper housing by a user when the charging case assembly is in the closed configuration.

In some embodiments, one or more illuminated indicators of the at least one illuminated indicator may be positioned along the inner surface of the lower housing such that the one or more illuminated indicators may be contained within the charging case assembly when the charging case assembly is in the closed configuration. In some embodiments, one or more illuminated indicators of the at least one illuminated indicator may be positioned along the vaporizer device such that the one or more illuminated indicators may be contained within the charging case assembly when the vaporizer device may be positioned within the cradle portion and the charging case assembly is in the closed configuration.

The method may further include connecting a power source to at least one of a device battery associated with the vaporizer device and a case battery associated with the charging case assembly. The magnetic coupling of the first magnet with the second magnet may include a magnetic force that secures the vaporizer device in the cradle portion of the coupling mechanism.

In another aspect of the current subject matter, a vaporizer charging case system may include a vaporizer device and a charging case assembly. The vaporizer device may include a first elongated side and a pair of device contacts positioned adjacent a charging end of the first elongated side. The charging case assembly may include an upper housing and a lower housing pivotably coupled to the upper housing. The lower housing may include a rechargeable power supply configured to be recharged and to provide power to the vaporizer device. A coupling mechanism may be configured to receive and position the vaporizer device within the lower housing. The coupling mechanism may include a cradle portion positioned along the lower housing and may include an elongated base that may be recessed along an inner surface of the lower housing. The cradle portion may be configured to receive the vaporizer device such that a first elongated side of the vaporizer device is positioned against the base of the cradle portion. A pair of case contacts may be positioned adjacent a first end of the base.

In some variations one or more of the following features can optionally be included in any feasible combination. For example, the base may be recessed a first distance from the inner surface of the lower housing. The first distance may be approximately equivalent to a thickness of the vaporizer device. The cradle portion may include a pair of elongated sidewalls extending approximately parallel to each other along opposing sides of the base and a pair of end walls extending between the pair of elongated sidewalls. The pair of case contacts may be positioned along a first end wall of the pair of end walls.

In some embodiments, the coupling mechanism may include a first magnet positioned adjacent the pair of case contacts. The first magnet may be configured to magnetically couple with a second magnet associated with the vaporizer device to assist with coupling the pair of case contacts with the pair of device contacts associated with the vaporizer device.

In some embodiments, the pair of elongated sidewalls may be positioned a second distance apart. The second distance may be approximately equivalent to a width of the vaporizer device. The second distance may be sized to allow a sliding fit between the vaporizer device and the pair of elongated sidewalls. The coupling mechanism may be configured to receive the vaporizer device in more than one orientation.

In some embodiments, the upper housing and the lower housing may be pivotably coupled by a hinge assembly that allows the charging case assembly to form an open configuration, where the upper housing may be pivoted away from the lower housing, and a closed configuration, where the upper housing may be pivoted towards the lower housing.

In some embodiments, at least one of the upper housing and the lower housing may include a transparent material allowing visualization of an illuminating device indicator along the vaporizer device when the illuminating device indicator is illuminated and the charging case assembly is in the closed configuration. The inner surface of the lower housing may include at least one illuminating case indicator for indicating one or more of a charging level and/or a charging state of either the charging case assembly and/or the vaporizer device.

In some embodiments, at least one of the upper housing and the lower housing may include a transparent material allowing visualization of the at least one illuminating case indicator when illuminated and the charging case assembly is in the closed configuration. The lower housing further may include a switch configured to activate one or more of the at least one illuminating case indicator when the charging case assembly transitions between the closed configuration and the open configuration.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 1A illustrates a front, top, and right side perspective view of a charging case assembly in an opened position consistent with implementations of the current subject matter;

FIG. 1B illustrates a front, top, and side perspective view of a charging case assembly in an closed position consistent with implementations of the current subject matter;

FIG. 3A illustrates a side view of a charging case assembly for a vaporizer device consistent with implementations of the current subject matter;

FIG. 3B illustrates a top view of a charging case assembly for a vaporizer device in an opened position consistent with implementations of the current subject matter;

FIG. 3C illustrates a bottom view of a charging case assembly for a vaporizer device in an opened position consistent with implementations of the current subject matter;

FIG. 3D illustrates a front view of a charging case assembly for a vaporizer device in an opened position consistent with implementations of the current subject matter;

FIG. 3E illustrates a rear view of a charging case assembly for a vaporizer device in an opened position consistent with implementations of the current subject matter;

FIG. 4B illustrates a bottom view of a charging case assembly for a vaporizer device in an closed position consistent with implementations of the current subject matter;

FIG. 4C illustrates a top view of a charging case assembly for a vaporizer device in an closed position consistent with implementations of the current subject matter;

FIG. 4E illustrates a rear view of a charging case assembly for a vaporizer device in an closed position consistent with implementations of the current subject matter;

FIG. 5G illustrates a schematic of a hinge assembly for a charging case assembly for a vaporizer device consistent with implementations of the current subject matter;

FIG. 5I illustrates a schematic of a hinge assembly for a charging case assembly for a vaporizer device consistent with implementations of the current subject matter;

FIG. 5J illustrates a cross-sectional view of a hinge assembly for a charging case assembly for a vaporizer device consistent with implementations of the current subject matter;

FIGS. 6A-6D illustrate a charging case assembly for a vaporizer device in an opened position consistent with implementations of the current subject matter;

DETAILED DESCRIPTION

Figure 2A:
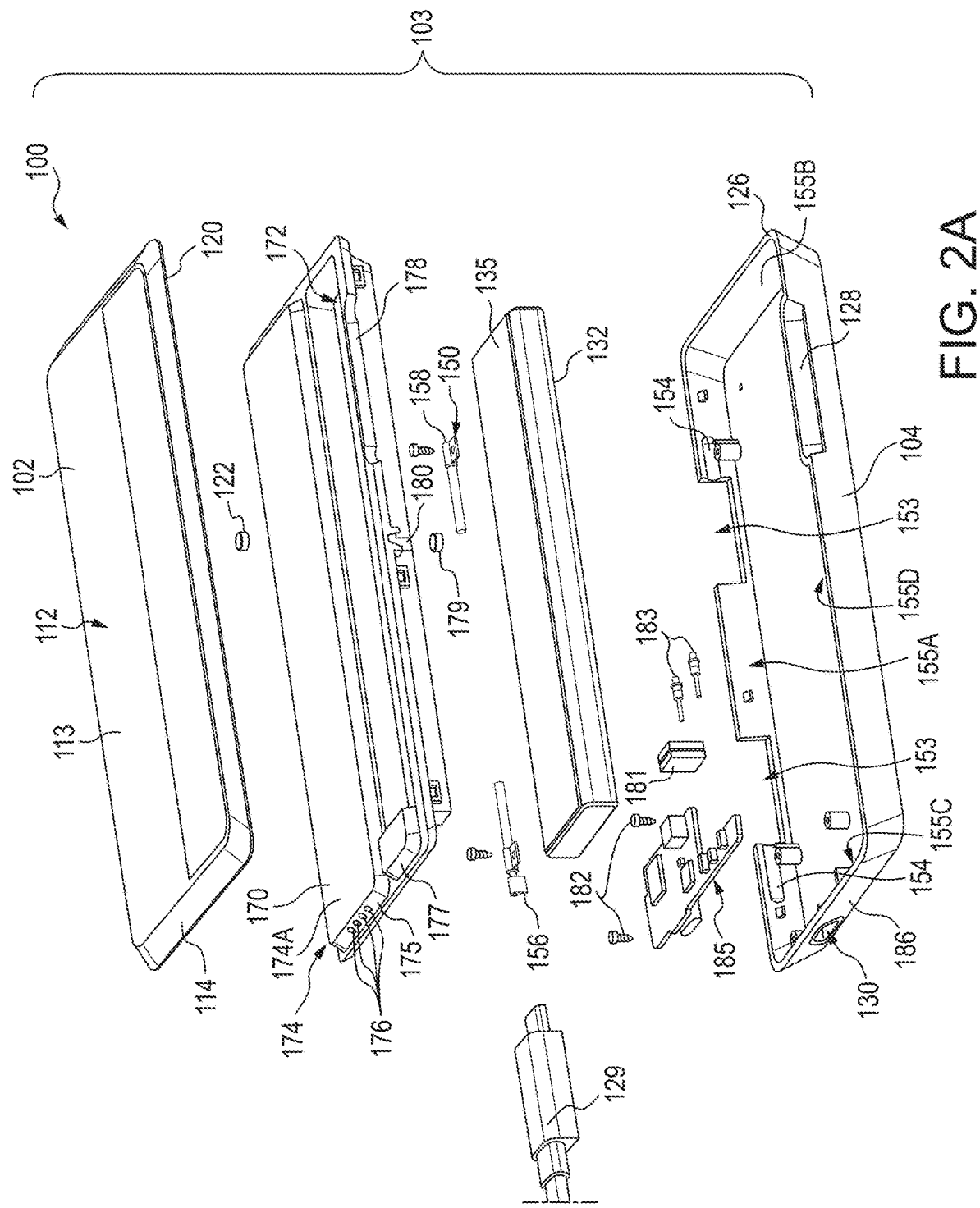
FIG. 2A illustrates an exploded view of a charging case assembly for a vaporizer device consistent with implementations of the current subject matter.

Implementations of the current subject matter include devices relating to vaporizing of one or more materials for inhalation by a user. The term "vaporizer" is used generically in the following description and refers to a vaporizer device. Examples of vaporizers consistent with implementations of the current subject matter include electronic vaporizers, electronic cigarettes, e-cigarettes, or the like. In general, such vaporizers are often portable, frequently handheld devices that heat a vaporizable material to provide an inhalable dose of the material.

The vaporizer device can include a power supply, such as a rechargeable battery. Certain rechargeable batteries may need to be recharged quickly so that the user can continue to use the vaporizer device after a period of time. Typical vaporizers may be rechargeable by, for example, connecting the device to an external power supply via a wired connection or a USB connection with a desktop computer, and/or connected with a wall outlet. Typically, the vaporizer battery may discharge after use and the user may not be able to locate an external power source quickly. For example, a computer or a wall outlet can typically be immobile and/or difficult to transport. Thus, a charging case assembly, consistent with implementations of the current subject matter, can desirably provide portable charging for a vaporizer device.

Currently available portable charging devices, particularly those available for vaporizer devices may be heavy, bulky (e.g., not volumetrically compact), and/or difficult to carry; difficult to locate within a bag or home; and/or difficult to open and/or close, and/or may not properly secure and/or protect a vaporizer device. A vaporizer charging case system, in accordance with implementations of the current subject matter, can desirably provide a low profile charging case assembly that can secure and/or provide power to a vaporizer device. The charging case assembly can be lightweight and/or less bulky. The charging case assembly can be generally aesthetically pleasing and/or easy to use. The charging case assembly can be easy to open and/or close, such as by allowing a user to open and/or close the charging case assembly with one hand, thumb, or finger. In some implementations, the charging case assembly can be dust, lint, and/or water resistant, and/or may limit dust or liquids from entering the interior volume of the charging case assembly. The charging case assembly can be easily cleaned and accessed. The charging case assembly can have rounded edges. The charging case assembly can be made of a corrosion resistant material, can be made of a biocompatible material, can be made of plastic, aluminum, or other materials.

A charging case assembly for a vaporizer device, consistent with features of one or more implementations of the current subject matter, may provide advantages and improvements relative to existing approaches, while also introducing additional benefits as described herein.

FIGS. 1A-1B illustrate a charging case assembly 100 consistent with implementations of the present disclosure. The charging case assembly 100 can secure and/or provide power to an electronic vaporization device. FIGS. 1A and 3A-3E illustrate an example of the charging case assembly 100 in an open position. FIGS. 1B and 4A-4E illustrate an example of the charging case assembly 100 in a closed position.

As described below, the charging case assembly 100 can include a housing 103 surrounding the internal components of the charging case assembly 100 and/or providing access to one or more internal components of the charging case assembly 100. The housing 103 can include an upper housing 102 and a lower housing 104. The lower housing 104 may be pivotably coupled to the upper housing 102, such as by a hinge assembly 150 that allows the charging case assembly 100 to form an open configuration where the upper housing 102 is pivoted away from the lower housing 104 and a closed configuration where the upper housing 102 pivoted towards the lower housing 104. In some embodiments, the lower housing 104 may include a rechargeable power supply (e.g., a battery 132) configured to be recharged and to provide power to the vaporizer device 101. The lower housing 104 may further include a coupling mechanism 106 configured to receive and position the vaporizer device 101 within the lower housing 104. The charging case assembly 100 can be in the open position when at least a portion of the upper housing 102 is separated from at least a portion of the lower housing 104, for example, such as when an inner rim 120 of the upper housing 102 separates from an inner rim 126 of the lower housing 104. In some implementations, the charging case assembly 100 is in the open position when the charging case assembly is fully opened. The charging case assembly 100 can be fully opened when the upper housing 102 is entirely disengaged from the lower housing 104 and/or when the upper housing 102 rotates away from the lower housing 104 by an angle of approximately 110 degrees, 90-100 degrees, 100-110 degrees, 110-120 degrees, 120-130 degrees, 120-140 degrees, or other ranges higher, lower, or therebetween. In some implementations, the case assembly is in the open position when at least a portion of the upper housing 102 disengages from the lower housing 104 by any distance.

FIG. 2A illustrates an exploded view of the charging case assembly 100 consistent with implementations of the current subject matter. As shown in at least FIG. 2A, the charging case assembly 100 can include an upper housing 102, a lower housing 104, a hinge assembly 150, and/or a frame 170, among other components. The upper housing 102 and the lower housing 104 can be connected by a mechanical, magnetic, and/or other type of connection. In some implementations, the upper housing 102 and the lower housing 104 can be pivotably connected on at least one side, such as a hinge side 133 of the charging case assembly 100 by, for example, the hinge assembly 150, as explained in more detail below. In some implementations, the upper housing 102 and the lower housing 104 can be detachably coupled by a mechanical, magnetic, and/or other type of connection on at least one side, such as an opening side 131 of the charging case assembly 100.

In some implementations, the charging case assembly 100 can include a power supply, such as a battery 132. The lower housing 104 can support at least a portion of the battery 132 within the charging case assembly 100. The battery 132 can include any battery, such as a lithium ion battery, among other types of batteries. The battery 132 can be a rechargeable battery.

The battery 132 can be charged through a wired connection, such as a USB charging cable, including a micro USB charging cable, or other charging cables. In some implementations, the battery 132 can be charged through a wireless connection, such as through various wireless charging means. The battery 132 can supply power to the vaporizer device 101 when the vaporizer device 101 is positioned within the charging case assembly 100 and/or otherwise coupled to the charging case assembly 100 in the open position and/or the closed position. In some implementations, the battery 132 can be fully charged within approximately 3-4 hours, 1-2 hours, 2-3 hours, 4-5 hours, or 6-7 or more or less hours. In some implementations, the battery 132 can be approximately 50% charged in approximately 1.5 hours. The battery 132 can be configured to supply power to the vaporizer device 101. In some implementations, the battery 132 can fully charge the vaporizer device 101 up to or more than five times before the battery 132 is fully discharged. As mentioned below, the battery 132 can be charged when the charging case assembly 100 is in the open and/or closed position.

The upper housing 102 can include various portions that are made of the same or varying materials. In some implementations, the upper housing 102 includes a uniform material. In this context, uniform is used to describe an implementation in which the upper housing is formed substantially of a same material or type of material, for example, such that one or more properties such as visual appearance, opacity, tactile feel, or the like are at least approximately consistent along a surface of the upper housing. In other implementations, at least a portion of the upper housing 102 can include a material that is different from some other portion (or, optionally, a remainder) of the upper housing 102, as explained below. In some implementations, the upper housing can be made of an opaque material, a transparent material, a translucent material, and/or a combination of one or more such materials. Transparent and translucent refer to materials that are not 100% opaque, for example, materials with opacity in a range of 1% up to 100%. In one example implementation, at least a portion of the upper housing can be made out of a translucent material (e.g., a material having less than 100%, in some examples one of 1%, 5%, 10%, 20%, 30%, 50% or some other value of opacity), thereby allowing a user to view contents and/or features contained within the charging case assembly 100. The transparent material of the upper housing 102 and/or the lower housing 104 may allow visualization of an illuminating device indicator (e.g., illuminating indicator 687 shown in FIG. 6B) along the vaporizer device 101 when the illuminating device indicator (e.g., illuminating indicator 687) is illuminated and the charging case assembly 100 is in the closed configuration. The inner surface 105 of the lower housing 104 may include at least one illuminating case indicator (e.g., illuminating indicators 176) for indicating one or more of a charging level and a charging state of either the charging case assembly 100 and/or the vaporizer device 101. The upper housing 102 and/or the lower housing 104 may include a transparent material allowing visualization of illuminating indicators 176 when illuminated and the charging case assembly 100 is in the closed configuration. In some embodiments, the lower housing 104 may include a switch 160 configured to activate one or more of the illuminating indicators 176 when the charging case assembly 100 transitions between the closed configuration and the open configuration.

The upper housing 102 can have an exterior shape that is generally trapezoidal, generally rectangular, or some other shape when viewed from above (e.g., the various possible shapes for the upper housing can representative of a cross section of the upper housing taken when the upper housing 102 is closed and in a plane at least approximately parallel to the vaporizer device when held in the charging case assembly). The upper housing 102 can have an outer surface 112 that includes an upper portion 113 and/or an outer rim surface 114. The outer rim surface 114 can be tapered upwardly and inwardly towards the upper portion 113. The outer rim surface 114 can extend from an outer perimeter of the upper housing 102 to the upper portion 113.

In some implementations, the upper housing 102 can include an inner surface 116. The inner surface 116 can include an inner portion 117 that can be raised relative to the outer perimeter of the upper housing 102. The inner portion 117 can be positioned inwardly and upwardly, relative to the outer perimeter of the upper housing 102. The inner portion 117 can be positioned approximately parallel to the outer surface 112. The inner surface 116 of the upper housing 102 can include an inner rim surface 118 that can extend from the inner rim 120 of the inner surface 116 to the inner portion 117. The inner rim surface 118 can be tapered upwardly and inwardly, relative to the inner rim 120. The inner rim 120 can extend along a perimeter of the inner surface 116. The inner rim 120 can be approximately flat and/or rounded, among other configurations.

The inner rim 120 can include a magnet receiver 122. As shown in at least FIG. 1A, the magnet receiver 122 can be positioned along the opening side 131 of the inner rim 120. The magnet receiver 122 can extend inwardly from the inner rim 120. The magnet receiver 122 can include a magnet 124. As explained below, a magnetic force created by the magnet 124 can assist with securing the upper housing 102 to the lower housing 104. The magnet receiver 122 can include a variety of shapes, such as a semi-circular shape, among other shapes.

In some implementations, the upper housing 102 can include a hinge housing protrusion 152 that can extend downwardly from the inner rim 120. The hinge housing protrusion 152 can at least partially surround at least one hinge component of the hinge assembly 150. In some implementations, the upper housing 102 can include one, two, three, four, or more hinge housing protrusions 152.

The lower housing 104 can surround and/or support at least a portion of the internal components of the charging case assembly 100. The lower housing 104 can be shaped to correspond to the shape of the upper housing 102. In some implementations, the lower housing 104 can have a same or similar shape to the upper housing 102. For example, the lower housing 104 can include a generally trapezoidal shape, rectangular shape, or other shape.

The lower housing 104 can have an inner rim 126 that extends along at least a portion of an outer perimeter of the lower housing 104. The inner rim 126 can be generally flat and/or rounded. The inner rim 126 can be configured to contact the upper housing 102 when the charging case assembly 100 is in the closed position. The inner rim 126 can support one or more other components of the charging case assembly 100. For example, the inner rim 126 can support at least a portion of the frame 170 within the interior volume of the charging case assembly 100 such as within the lower housing 104, as explained below.

The lower housing 104 can include one or more hinge recesses 153. The hinge recesses 153 can be positioned along a portion of the inner rim 126 of the lower housing 104. The hinge recesses 153 extend into a sidewall of the lower housing 104. The hinge recesses 153 can be shaped and/or sized to receive the corresponding hinge housing protrusion 152. The hinge recesses 153 can include one, two, three, or four or more hinge recesses 153 to correspond to the number of hinge housing protrusions 152. The hinge recesses 153 can be sized and shaped to receive the hinge housing protrusions 152.

The lower housing can include an inner rim surface. The inner rim surface can include a first sidewall 155A. The first sidewall 155A can be positioned on the hinge side 133 of the lower housing 104. The first sidewall 155A of the lower housing 104 can include one or more hinge rod slots 154. The hinge rod slots 154 can extend along a portion of an inner surface of the sidewall of the lower housing 104. In some implementations, the hinge rod slots 154 can extend from a side portion of one or more of the hinge recesses 153.

In some implementations, the hinge rod slots 154 may extend through a portion of a thickness of the sidewall of the lower housing 104. The hinge rod slots 154 can be configured to receive at least a portion of at least one component of the hinge assembly 150. The hinge rod slots 154 can receive a corresponding cam rod 158 of the hinge assembly 150.

The lower housing 104 can include a second sidewall 155D positioned opposite the first sidewall 155A. The second sidewall 155D can include a recessed portion 128. The recessed portion 128 can extend inwardly towards the interior volume of the lower housing 104 and/or downwardly from the inner rim 126 along a portion of the second sidewall 155D towards the bottom side of the lower housing 104. The recessed portion 128 can be positioned at a rearward end portion of the second sidewall 155D of the lower housing 104. In some implementations, the recessed portion 128 can be positioned on other portions of the second sidewall 155D and/or other sidewalls of the lower and/or upper housing 104, 102. The recessed portion 128 can be desirably shaped and/or positioned to allow a user to more easily open and/or close the charging case assembly 100, such as by using the user's thumb, finger, or hand. The recessed portion 128 can allow the user to pull up on at least the inner rim 120 of the upper housing 102 to separate the upper housing 102 from the lower housing 104. In some implementations, the recessed portion 128 can allow the user to push down on the lower housing 104 to separate and/or rotate the upper housing 102 and/or the lower housing 104.

The lower housing 104 can include a charging port 130. The charging port 130 can be desirably positioned to allow a power supply cable 129 to be connected with the charging case assembly 100. The charging port 130 can be shaped to allow the power supply cable to pass through a sidewall of the lower housing to charge the battery 132 positioned within the charging case assembly 100. The charging port 130 can be positioned on a third sidewall 155C of the lower housing 104 that connects the first and second sidewalls 155A, 155D. The charging port 130 can extend through the third sidewall 155C to allow the battery 132 (e.g., power supply) to be charged with and/or without the charging case assembly 100 in the open and/or closed position. For example, the battery 132 of the charging case assembly 100 may be charged while either in the open position or in the closed position. In some implementations, the charging port 130 is positioned centered along the third sidewall 155C. In some implementations, the charging port 130 is positioned offset from the central axis of the case assembly, such as closer to the hinge side 133 and/or the opening side 131 of the lower housing 104. The charging port 130 can be positioned in other regions of the charging case assembly 100 for easy access to charge the battery 132 of the charging case assembly 100.

As shown in FIG. 2A, the charging port 130 can provide a connection between the battery 132 and the power supply cable 129. The power supply cable 129 can be directly connected with the battery 132. In some implementations, the power supply cable 129 is connected to the battery 132 via a power-connecting element. In some implementations, the power supply cable 129 is connected to the battery 132 via a printed circuit board assembly (PCBA).

The PCBA 185 can include a switch 160, and/or a microcontroller, and circuitry. The microcontroller can include the operating logic and software instructions for controlling certain features or parameters of the charging case assembly 100. In some embodiments, the microcontroller can include operating logic and software instructions for providing one or more indicators, such as illuminating one or more lights (e.g., LED's) associated with either the charging case assembly 100 or the vaporizer device 101. For example, the microcontroller can include operating logic and software instructions that are dependent upon activation of a sensor or a switch, such as switch 160.

In some embodiments, the charging case assembly 100 consistent with implementations of the current subject matter may also include one or more inputs, such as buttons, dials, or the like, and/or sensors, including accelerometers or other motion sensors, capacitive sensors, flow sensors, or the like. These sensors may be used by the charging case assembly 100 to detect user handling and interaction. For example, detection of a rapid movement (such as a tapping or shaking motion) of the charging case assembly 100 may be interpreted by the microcontroller (e.g. through receipt of a signal from one or more of the sensors) as a user command to provide an indication of either a charging state (e.g., charged or charging) or charging level (e.g., battery is 50% charged, etc.), as described in more detail below.

The vaporizer charging case system may include a coupling mechanism 106 configured to couple the vaporizer device 101 with the charging case assembly 100. The coupling mechanism 106 may be configured to receive the vaporizer device 101 in more than one orientation. The coupling mechanism 106 may include a cradle portion (e.g., charging cradle slot 172) configured to receive the vaporizer device 101 and may further include a pair of case electrical contacts 183. The charging cradle slot 172 may be positioned along the lower housing 104 and include an elongated base 107 that is recessed along an inner surface 105 of the lower housing 104 such that a first elongated side of the vaporizer device 101 may be positioned against the base 107 of the charging cradle slot 172 and the pair of case electrical contacts 183 may be positioned adjacent a first end 108 of the base 107 when the vaporizer device 101 is coupled with the charging case assembly 100. The base 107 may be recessed a first distance from the inner surface 105 of the lower housing 104. The first distance may be approximately equivalent to a thickness of the vaporizer device 101. The charging cradle slot 172 may include a pair of elongated sidewalls 155A, 155D extending approximately parallel to each other along opposing sides of the base 107 and a pair of end sidewalls 155B, 155C extending between the pair of elongated sidewalls 155A, 155D. The pair of case electrical contacts 183 may be positioned along a first end sidewall of the pair of end sidewalls 155B, 155C. The pair of elongated sidewalls 155A, 155D may be positioned a second distance apart, such that the second distance may be approximately equivalent to a width of the vaporizer device 101. The second distance may be sized to allow a sliding fit between the vaporizer device 101 and the pair of elongated sidewalls 155A, 155D.

In some embodiments, the microcontroller can include operating logic and software instructions for certain security measures. The security measures can include wireless and/or wired security measures. In some implementations, the microcontroller can include a tag reader. The tag reader can be configured to communicate with the vaporizer device 101. The vaporizer device 101 can include a corresponding tag. In some implementations, the vaporizer device 101 can include the tag reader and the charging case assembly 100 can include the tag. When the vaporizer device is positioned within the charging cradle slot 172 of the frame 170, coupled with the case electrical contacts 183, and/or positioned near the charging case assembly 100, the tag reader can receive the tag to determine whether the tag should be authenticated. If the tag is authenticated, the charging case assembly will be allowed to supply power to the vaporizer device 101. If the tag is not authenticated, the charging case assembly may not be allowed to supply power to the vaporizer device 101. In some implementations, the microcontroller can communicate with an external device, such as a mobile device, and/or an external monitor, among other devices through a wireless and/or wired connection. The microcontroller can send measured data and/or device authentication statistics to the external device.

In some implementations, the charging case assembly 100 can include a variety of security measures through the case electrical contacts 183. For example, the charging case assembly 100 can authenticate the vaporizer device 101 through the case electrical contacts 183. In some implementations, the charging case assembly 100 can include a string and/or a validation reader. In some implementations, the vaporizer device 101 can authenticate the charging case assembly via a string and/or a validation reader.

As explained below, the switch 160 can be actuated to determine whether the charging case assembly 100 is in the opened and/or the closed position. The PCBA 185 can be coupled to the lower housing 104 via a variety of connection arrangements, such as press-fit into the lower housing 104 and/or via fasteners, such as screws 182, among other arrangements.

The PCBA 185 can provide an electrical connection between the battery 132 and the case electrical contacts 183. The case electrical contacts 183 can include pins, springs, or any other type of charging contacts that can electronically connect the PCBA 185 with the vaporizer device 101 when assembled. The PCBA 185 can include a retention mechanism 181. The retention mechanism 181 can be configured to couple the vaporizer device 101 with the charging cradle slot 172. The retention mechanism 181 can include a mechanical, electronic, and/or magnetic connection mechanism. For example, the retention mechanism 181 can include one, two, three, four, or more retention magnets. The retention magnets can provide a magnetic contact for the vaporizer device 101. The vaporizer device 101 can be magnetically connected to the retention magnets, such as through the frame 170, when the vaporizer device 101 is placed in the charging cradle slot 172. The magnetic coupling can include a magnetic force that secures the vaporizer device 101 in the cradle portion (e.g., charging cradle slot 172) of the coupling mechanism 106. The retention magnets can help to retain the vaporizer device 101 when the vaporizer device is positioned within the charging cradle slot 172. The retention magnets can help to limit unwanted movement of the vaporizer device 101 within the charging cradle slot 172. For example, a coupling mechanism (e.g., the retention mechanism 181) may include a first magnet 140 positioned adjacent to the pair of case electrical contacts 183. The first magnet 140 may be configured to magnetically couple with a second magnet 640 (shown in FIG. 6A) associated with the vaporizer device 101 to assist with coupling the pair of case electrical contacts 183 with a pair of device charging contacts 684 associated with the vaporizer device 101. As explained below, the retention magnets (e.g., first magnet 140) can be positioned between the case electrical contacts 183 and/or under the frame 170. The retention magnets can provide a retention mechanism 181 that can desirably provide feedback to the user to allow the user to feel that the vaporizer device 101 is being held in the proper position.

Figure 2B:
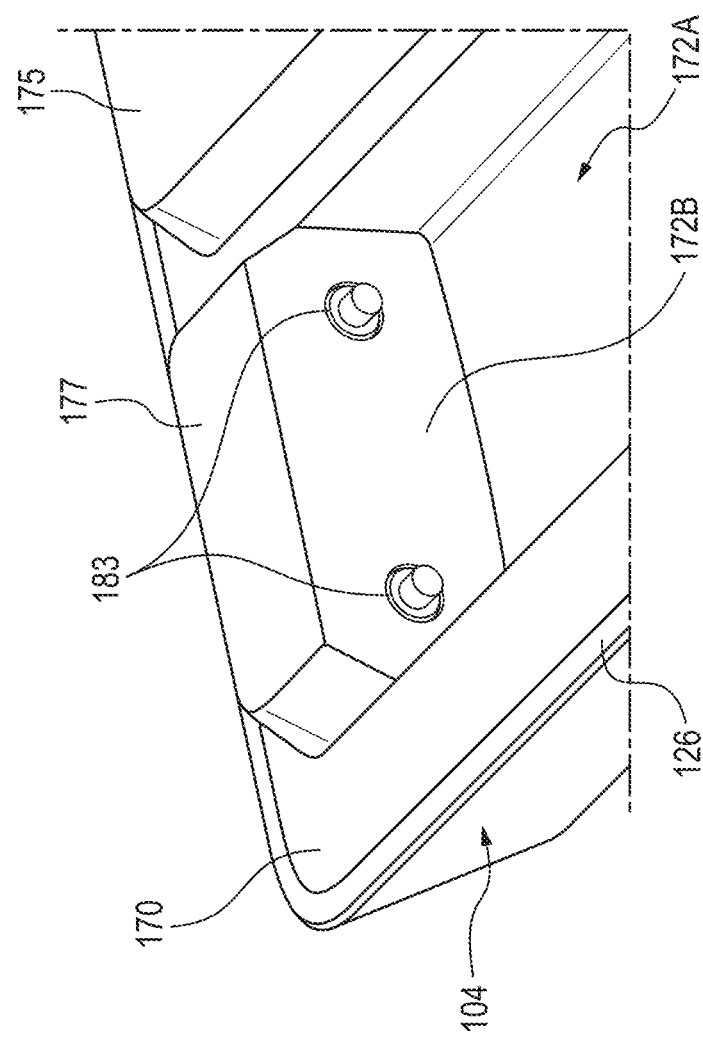
FIG. 2B illustrates a portion of a charging case assembly for a vaporizer device consistent with implementations of the current subject matter.
Figure 4A:
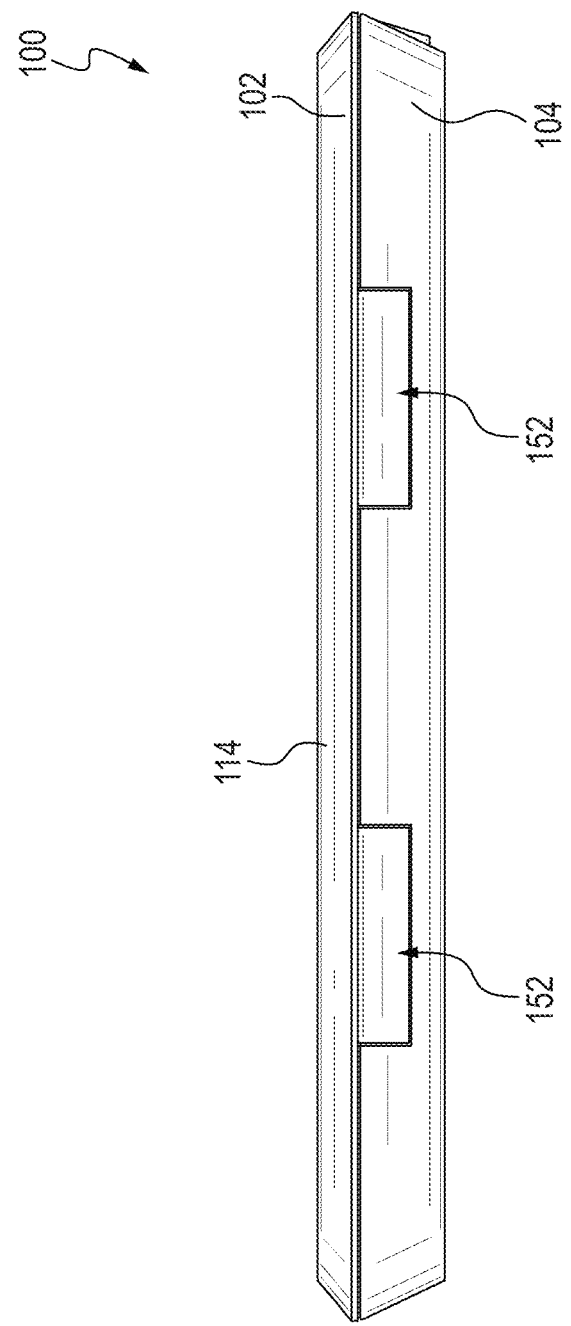
FIG. 4A illustrates a side view of a charging case assembly for a vaporizer device in an closed position consistent with implementations of the current subject matter.
Figure 4D:
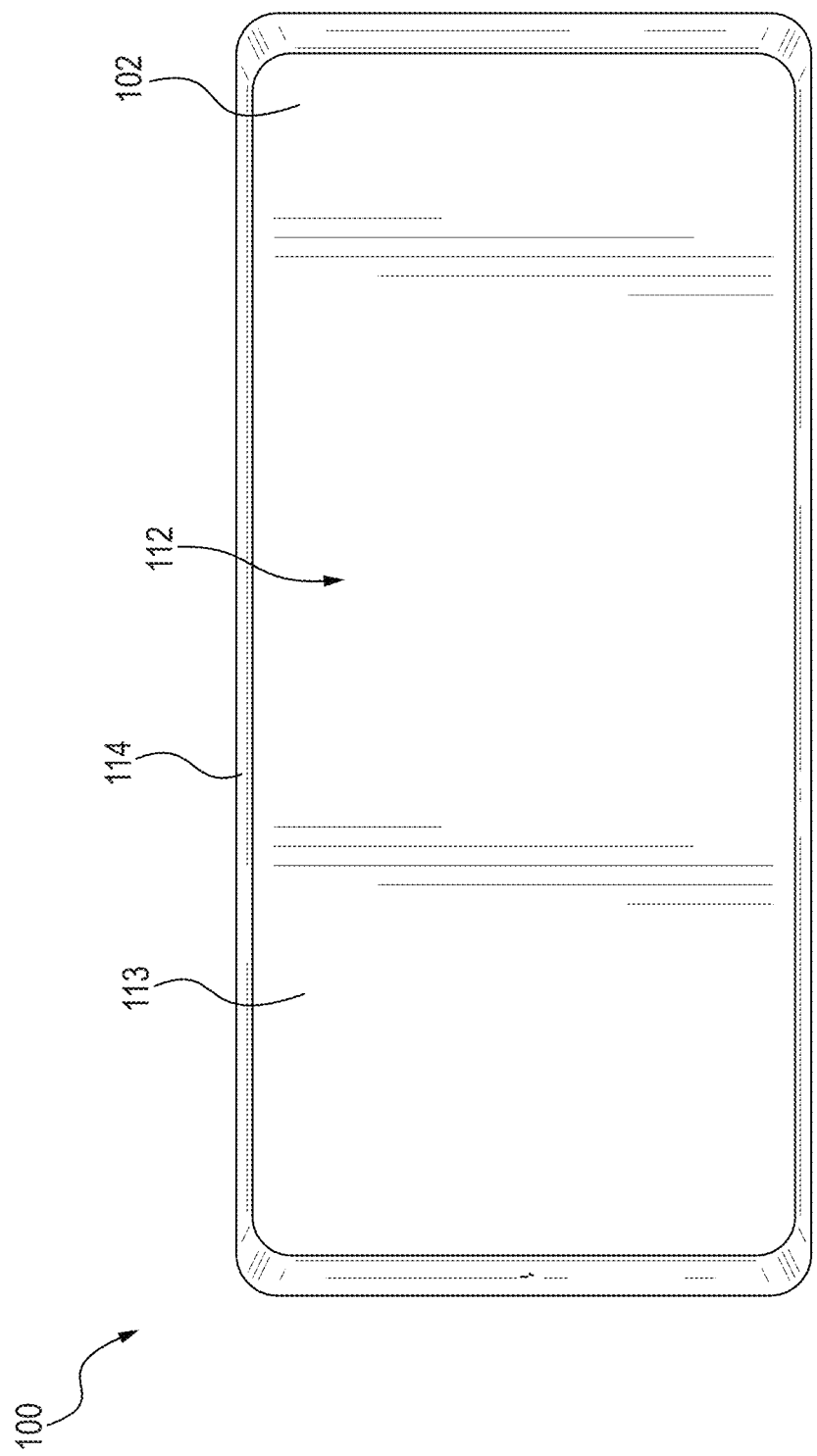
FIG. 4D illustrates a front view of a charging case assembly for a vaporizer device in an closed position consistent with implementations of the current subject matter.

FIG. 2A illustrates an example configuration of the frame 170 in accordance with the current subject matter. FIG. 2B illustrates a close up view of a portion of the frame 170 in accordance with the current subject matter. The frame 170 can be positioned within the charging case assembly 100. The frame 170 can be coupled with the lower housing 104. In some implementations, the frame 170 rests within the lower housing 104. In some implementations, the frame 170 is coupled to the lower housing 104 via an adhesive and/or a mechanical arrangement, such as by mechanical fasteners, a press-fit arrangement, a snap-fit arrangement, and/or the like. The frame 170 can help to secure the vaporizer device 101 within the charging case assembly 100 and/or can help to retain the internal component of the charging case assembly 100.

The frame 170 can have an upper surface. The upper surface can be generally flat. In some implementations, the upper surface can have raised and/or recessed portions, and/or can be generally curved. As shown in FIG. 2A, the frame 170 can include a battery cover portion 174. The battery cover portion 174 can be positioned above the battery 132 when assembled. The battery cover portion 174 can be raised relative to the upper surface of the frame 170. For example, the battery cover portion 174 can include a cover portion surface 174A that is spaced apart upwardly from the remainder of the upper surface of the frame 170. The cover portion surface 174A can be spaced apart by a cover portion sidewall 175. The cover portion sidewall 175 can extend upwardly from the upper surface of the frame 170 to connect the cover portion surface 174A. The cover portion sidewall 175 can be tapered inwardly and upwardly, for example. The cover portion surface 174A can be raised to allow for a larger battery 132. In some implementations, the battery cover portion 174 is shaped and sized to retain the battery 132. When assembled, the battery cover portion 174 can press down on a top surface of the battery 132 to secure the battery 132 between the frame 170 and the lower housing 104.

The battery cover portion 174 can be positioned near the hinge side 133 of the lower housing 104. The battery cover portion 174 can be positioned on either side of the lower housing 104. The battery cover portion 174 can be desirably positioned to cover the battery 132 near the charging port 130 and/or near the hinge assembly 150.

In some implementations, the frame can include a plurality of illuminating indicators 176, which can optionally be LEDs (light-emitting diode) or other light sources. The cover portion sidewall 175 of the battery cover portion 174 can include one or more illuminating indicators 176, such as one, two, three, four, five, six, or more illuminating indicators 176. The illuminating indicators 176 can flash, change colors, and/or brighten, or provide other indications that the charging case assembly 100 is in the closed and/or opened position. The illuminating indicators 176 can flash, change colors, brighten, produce a sound or haptics, and/or or send a message to the user, or provide other indications showing that the charging case assembly 100 is actively charging, that the charging case assembly is fully charged (if on charge), the level of case charge (e.g., when not actively charging), and/or the like. For example, in some implementations, when the charging case assembly 100 is actively charging, the illuminating indicators 176 can illuminate, such as through progressive illumination. The illuminating indicators 176 can reduce in brightness and/or number of lit up illuminating indicators to show that the case is in an actively charging state or that the charging case assembly 100 is plugged into a power supply cable 129. The illuminating indicators 176 can illustrate a level of charging. For example, when the battery 132 is at a charging level of approximately 0-25%, one illuminating indicator can pulse; when the battery 132 is at a charging level of approximately 25-50%, a first illuminating indicator can be lit and a second illuminating indicator can pulse; when the battery 132 is at a charging level of approximately 50-75%, the first and second illuminating indicators can be lit and a third illuminating indicator can pulse; when the battery 132 is at a charging level of approximately 75-100%, the first, second, and third illuminating indicators can be lit and a fourth illuminating indicator can pulse, etc. In some implementations, when the battery 132 is fully charged, each of the illuminating indicators 176 may be steadily lit and/or pulse.

In some implementations, when the charging case assembly 100 is moved into the opened position, the illuminating indicators 176 can be progressively illuminated depending on the charging level, with the brightness of the last indicator proportional to the charging level, for example. Similar to the charging level illuminating indicators, in this example implementation, the illuminating indicators 176 can pulse or have varying degrees of brightness depending on the charging level.

In some implementations, if the charging case assembly 100 is in the opened position and the vaporizer device 101 is positioned within the charging case assembly 100 and/or is properly connected to the charging case assembly 100, the illuminating indicators 176 can remain illuminated to show the charging level of the charging case assembly 100 and/or the vaporizer device 101, until the vaporizer device 101 is removed, disconnected, and/or the charging case assembly 100 moves to the closed position.

In some implementations, the illuminating indicators 176 can illustrate a fault state to indicate when there is an error reading the charging level of the battery 132 and/or the vaporizer, and/or the like. For example, in the error state, all of the illuminating indicators 176 can indicate that there is an error, such as by flashing a predetermined number of times.

In some implementations, the frame 170 can include one or more hinge recesses 153A. The hinge recesses 153A can be positioned along a portion of the upper surface of the frame 170. The hinge recesses 153A can extend into a sidewall of the frame 170. The hinge recesses 153A can be shaped and/or sized to receive at least a portion of the corresponding hinge housing protrusion 152. The hinge recesses 153A can be shaped, sized and/or positioned to align with the hinge recesses 153 of the lower housing 104. The hinge recesses 153A can include one, two, three, or four or more hinge recesses 153A to correspond to the number of hinge housing protrusions 152.

The frame 170 can include a charging cradle slot 172. The charging cradle slot 172 can include a recessed portion 172A and/or a raised portion 177. The raised portion 177 can be raised relative to the upper surface of the frame 170. The raised portion 177 can include a similar shape to a portion of the battery cover portion 174. For example, the raised portion 177 can have an upper surface and/or sidewalls extending between the upper surface and the upper surface of the frame 170. The raised portion 177 can be configured to be positioned above at least a portion of the retention mechanism 181 and/or the case electrical contacts 183 to secure the retention mechanism 181 and/or the case electrical contacts 183 between the frame 170 and the lower housing 104.

The charging cradle slot 172 can extend along at least a portion of a length of the frame 170 between the bottom end portion and the top end portion of the frame 170. The recessed portion 172A of the charging cradle slot 172 can be shaped and/or sized to allow the vaporizer device 101 to fit within and be secured within the charging cradle slot 172. In some implementations, the charging case assembly, such as the charging cradle slot 172 can be shaped and/or sized to retain one, two, three, or four vaporizers or portions of vaporizers. In some implementations, the length of the charging cradle slot 172 corresponds to the length of the vaporizer device 101. In some implementations, the length of the charging cradle slot 172 is longer than a length of the vaporizer device 101. Such configurations can allow the vaporizer to be easily placed within and/or removed from the charging case assembly 100.

As shown in FIG. 2B, the case electrical contacts 183 can extend through a bottom wall 172B of the recessed portion 172A. The case electrical contacts 183 can provide an electrical connection between the PCBA and/or the battery 132 and the vaporizer device 101 when assembled. In some implementations, the retention mechanism 181 is positioned on the opposite side of the bottom wall 172B (e.g., between the frame 170 and the lower housing 104) to help to secure the vaporizer device 101 within the recessed portion 172A.

The frame 170 can include an open side positioned opposite the hinge side. The frame 170 can include a recessed portion 178 positioned along the open side. The recessed portion 128 can extend inwardly towards the charging cradle slot 172 and/or downwardly from the upper surface along a portion of the hinge side towards the bottom side of the frame 170. The recessed portion 178 can be positioned at a rearward end portion of the open side of the frame 170 and/or can be positioned to align with the recessed portion 128 of the lower housing 104 The recessed portion 178 can be desirably shaped and/or positioned to allow a user to more easily open and/or close the charging case assembly 100, such as by using the user's thumb, finger, or hand.

The frame 170 can include a magnet receiver 180. As shown in at least FIG. 2A, the magnet receiver 180 can be positioned along the open side of the frame 170. In some implementations, the magnet receiver 180 is defined by the frame 170. The magnet receiver 122 can extend inwardly and/or downwardly from the upper surface of the frame 170. The magnet receiver 180 can be configured to receive a magnet 179. The magnet 179 can be configured to magnetically connect with the magnet 124 can help to secure the upper housing 102 to the lower housing 104. The magnet receiver 180 can include a variety of shapes, such as a semi-circular shape, among other shapes to correspond to the shape of the magnet 179. The magnet 179 can be positioned within the frame 170 and/or the lower housing 104. The magnet 179 can be positioned to align with the magnet 124 to provide a secure connection between the upper housing 102 and the lower housing 104. The magnetic connection between the magnet 179 and the magnet 124 can be strong enough to sufficiently secure the upper housing 102 to the frame 170 when the charging case assembly 100 is in the closed position, yet weak enough to allow the user to easily move the charging case assembly 100 from the closed position to the opened position (and vice versa). The magnetic connection can be desirably strong to help limit unwanted opening of the charging case assembly 100.

Figure 5A:
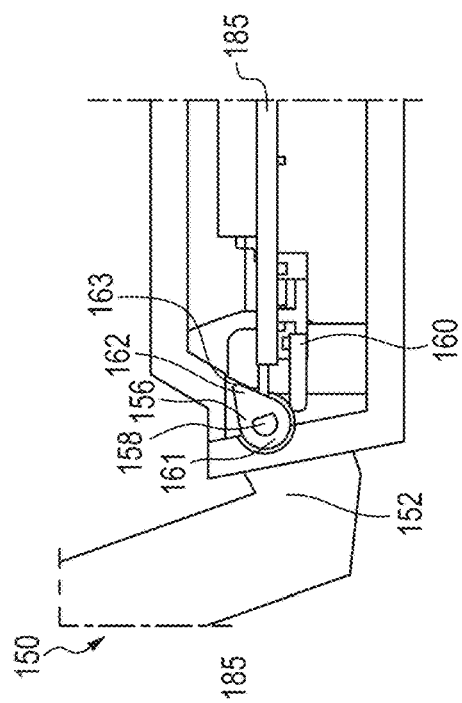
FIG. 5A illustrates a cross-sectional view of a hinge assembly incorporated in a charging case assembly for a vaporizer device in an opened position consistent with implementations of the current subject matter.
Figure 5C:
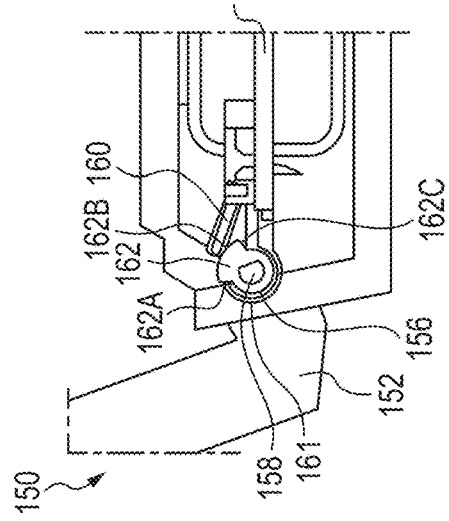
FIG. 5C illustrates a cross-sectional view of a hinge assembly incorporated in a charging case assembly for a vaporizer device in an opened position consistent with implementations of the current subject matter.
Figure 5E:
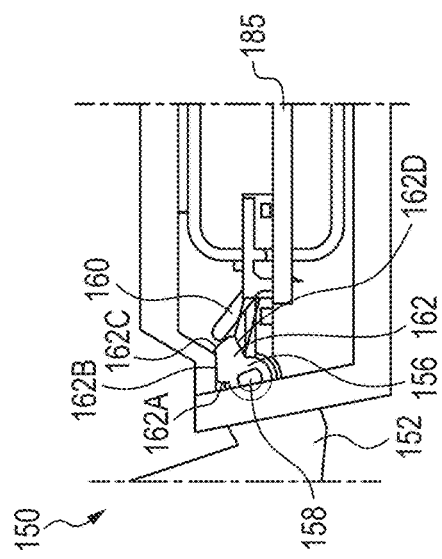
FIG. 5E illustrates a cross-sectional view of a hinge assembly incorporated in a charging case assembly for a vaporizer device in an opened position consistent with implementations of the current subject matter.
Figure 5B:
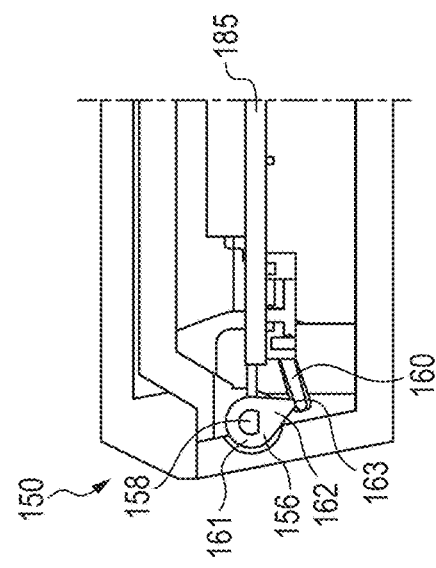
FIG. 5B illustrates a cross-sectional view of a hinge assembly incorporated in a charging case assembly for a vaporizer device in a closed position consistent with implementations of the current subject matter.

FIG. 5A illustrates a cross-sectional view of the hinge assembly 150 incorporated in the charging case assembly 100 for the vaporizer device 101 in an opened position consistent with implementations of the current subject matter and FIG. 5B illustrates a cross-sectional view of the hinge assembly 150 in a closed position consistent with implementations of the current subject matter. The hinge assembly 150 can include the hinge housing protrusion 152, a cam 156, a cam rod 158, and a switch 160. Though the example charging case assembly 100 is shown as having the hinge assembly 150 to open and close the charging case assembly 100, other configurations are contemplated, such as any mechanical or magnetic connection and/or the like. For example, the upper housing 102 and the lower housing 104, and/or the frame 170 can be press-fit, snap-fit, mechanically fastened, and/or adhered.

The cam 156 can be coupled with the cam rod 158. The cam 156 can be rotationally fixed to the cam rod 158 such that the cam rod 158 and the cam 156 can rotate about an axis of rotation. In some implementations, the cam rod 158 extends through the cam 156. In some implementations, the cam 156 and the cam rod 158 are integrally formed. In some implementations, at least a portion of the cam rod 158 can be positioned within the hinge rod slots 154 of the lower housing 104. In some implementations, at least a portion of the cam rod 158 and/or the cam 156 can be housed within the hinge housing protrusion 152 of the upper housing 102.

The cam 156 can include a cam extension portion 162. The cam extension portion 162 can extend from a side of the cam 156. The cam extension portion 162 can be configured to contact the switch 160. The cam extension portion 162 can include one or more surfaces. In some implementations, the cam extension portion 162 can include a first surface 162A, a second surface 162B, a third surface 162C, and/or a fourth surface 162D, or more surfaces.

FIG. 5B illustrates an example configuration of the hinge assembly 150 when the charging case assembly 100 is in the closed position. In the closed position, at least a portion, such as an end portion, of the switch 160 can be positioned above at least a portion of the cam extension portion 162. In some implementations, the switch 160 can rest and/or be supported on the first surface 162A of the cam extension portion 162 such as when no force is applied. In the closed position, the switch 160 can be positioned approximately parallel to the PCBA 185.

The charging case assembly 100 can be opened by rotating the upper housing 102 relative to the lower housing 104 (or vice versa) about the axis of rotation. As the upper housing 102 rotates, the cam 156 and cam rod 158 can rotate in a first direction, such as a counter-clockwise direction. As the cam 156 rotates, the cam 156 can push the end portion of the switch 160 upwardly. Such movement can cause the switch 160 to pivot about a switch axis of rotation in a second direction, opposite the first direction, such as a clockwise direction. The end portion of the switch 160 can slide along an outer surface of the cam 156, such as at least a portion of the first surface 162A, the second surface 162B, and/or the third surface 162C. FIG. 5A illustrates an example configuration of the charging case assembly 100 in the opened position. In the opened position, the end portion of the switch 160 can be supported by at least the third surface 162C. In the opened position, the switch 160 can be positioned at an angle relative to the PCBA 185.

In some implementations, the hinge assembly 150 can include a biasing member that can bias the switch 160 into the closed position. For example, the biasing member can bias the switch 160 into a position that is approximately parallel to the PCBA 185. In some implementations, the biasing member can include at least a portion of the cam 156, such as the cam extension portion 162. The bias of the switch 160 towards the closed position can desirably provide a frictional hinge. In some implementations, the bias of the switch 160 towards the closed position can desirably provide a friction-feel to the user as the user opens and/or closes the charging case assembly 100. For example, the hinge assembly 150 can enhance the durability of the charging case assembly 100 such that the charging case assembly 100 can be opened and closed a large number of times without failure. The hinge assembly 150 can desirably provide sufficient rigidity such that the case assembly may not be easily breakable when the charging case assembly 100 is in the opened position or the closed position.

When the charging case assembly 100 is in the opened position and/or the closed position, the switch 160 can activate an illuminating indicator 186 (shown in FIG. 2A). The illuminating indicator 186 can flash, change colors, and/or brighten, or provide other indications that the charging case assembly 100 is in the closed and/or opened position.

Figure 5D:
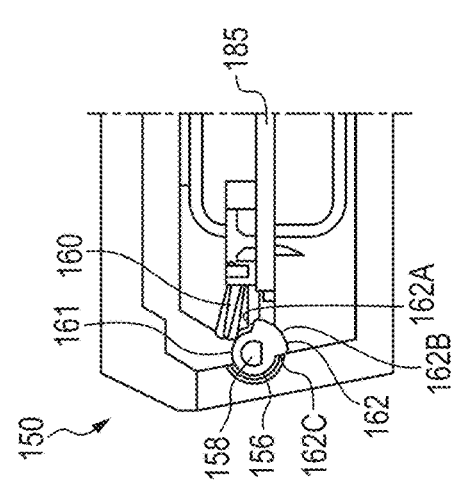
FIG. 5D illustrates a cross-sectional view of a hinge assembly incorporated in a charging case assembly for a vaporizer device in a closed position consistent with implementations of the current subject matter.

FIG. 5C illustrates a cross-sectional view of another embodiment of the hinge assembly 150 in an opened position consistent with implementations of the current subject matter and FIG. 5D illustrates a cross-sectional view of the hinge assembly 150 in a closed position consistent with implementations of the current subject matter. The hinge assembly 150 illustrated in FIGS. 5C and 5D can include the same or similar properties to the other hinge assemblies described herein. The hinge assembly 150 can be used with and/or instead of the other hinge assemblies described herein.

The cam 156 can include a main body portion 161 and cam extension portion 162. The cam extension portion 162 can extend radially outward from a side of the cam 156. The cam extension portion 162 can be configured to contact the switch 160. The cam extension portion 162 can include one or more surfaces. In some implementations, the cam extension portion 162 can include a first surface 162A, a second surface 162B, and/or a third surface 162C, or more surfaces.

FIG. 5D illustrates an example configuration of the hinge assembly 150 when the charging case assembly 100 is in the closed position. In the closed position, at least a portion, such as an end portion, of the switch 160 can be positioned above at least a portion of the cam extension portion 162. In some implementations, the switch 160 can rest and/or be supported on the main body portion 161. In the closed position, the switch 160 can be positioned approximately parallel to the PCBA 185, or angled relative to a top surface of the PCBA 185.

The charging case assembly 100 can be opened by rotating the upper housing 102 relative to the lower housing 104 (or vice versa) about the axis of rotation. As the upper housing 102 rotates, the cam 156 and cam rod 158 can rotate in a first direction, such as a counter-clockwise direction. As the cam 156 rotates, the cam 156 can push the end portion of the switch 160 upwardly and can cause the switch to pivot about a switch axis of rotation in a second direction, opposite the first direction, such as a clockwise direction. The end portion of the switch 160 can slide along an outer surface of the cam 156, such as at least a portion of the main body portion 161, the first surface 162A, and/or the second surface 162B.

FIG. 5C illustrates an example configuration of the charging case assembly 100 in the opened position. In the opened position, the end portion of the switch 160 can be supported by the second surface 162B. In the opened position, the switch 160 can be positioned at an angle relative to the PCBA 185. In some implementations, in the opened position, the switch 160 can be positioned at an angle relative to the surface of the PCBA 185 that is greater than the angle of the switch 160 relative to the surface of the PCBA 185 in the closed position.

In some embodiments, the hinge assembly 150 can include a biasing member that can bias the switch 160 into the closed position. For example, the biasing member can bias the switch 160 into a position that is approximately parallel to the PCBA 185 or angled relative to the PCBA 185 as shown in at least FIG. 5D. In some embodiments, the biasing member can include at least a portion of the cam 156, such as the cam extension portion 162. Biasing the switch 160 towards the closed position can desirably provide a frictional hinge. In some implementations, biasing the switch 160 towards the closed position can desirably provide a friction-feel to the user as the user opens and/or closes the charging case assembly 100. For example, the hinge assembly 150 can enhance the durability of the charging case assembly 100 such that the charging case assembly 100 can be opened and closed a large number of times without failure. The hinge assembly 150 can desirably provide sufficient rigidity such that the case assembly may not be easily breakable when the charging case assembly 100 is in the opened position and/or the closed position.

When the charging case assembly 100 is in the opened position and/or the closed position, the switch 160 can activate an illuminating indicator 186 (shown in FIG. 2A). The illuminating indicator 186 can flash, change colors, and/or brighten, or provide other indications that the charging case assembly 100 is in the closed position. In addition to or alternative to the charging case assembly 100 including the switch, the charging case assembly 100 can include any number of a variety of sensor or mechanical elements that can assist with activating one or more illuminating indicators in response to various actions performed by or to the charging case assembly 100. For example, in some embodiments the charging case assembly 100 includes a magnetic closure feature that magnetically couples the upper and lower housings together. Release of the magnetic closure, such as when the upper housing is pivoted away from the lower housing to open the charging case assembly 100, can result in activating one or more indicators.

Figure 5F:
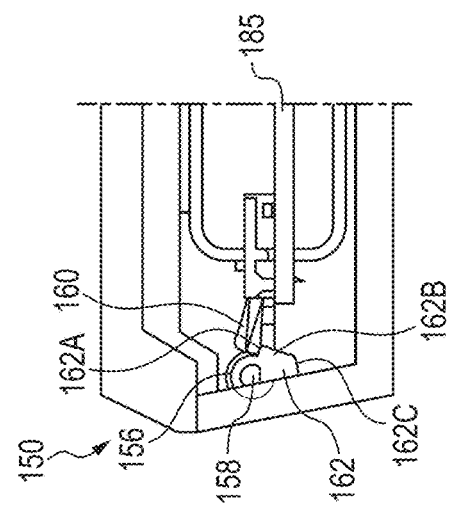
FIG. 5F illustrates a cross-sectional view of a hinge assembly incorporated in a charging case assembly for a vaporizer device in a closed position consistent with implementations of the current subject matter.

FIG. 5E illustrates a cross-sectional view of another embodiment of the hinge assembly 150 in an opened position consistent with implementations of the current subject matter and FIG. 5F illustrates a cross-sectional view of the hinge assembly 150 in a closed position consistent with implementations of the current subject matter. The hinge assembly 150 illustrated in FIGS. 5E and 5F can include the same or similar properties to the other hinge assemblies described herein. The hinge assembly 150 can be used with and/or instead of the other hinge assemblies described herein.

The cam 156 can include a main body portion 161 and cam extension portion 162. The cam extension portion 162 can extend radially outward from a side of the cam 156. The cam extension portion 162 can be generally triangular, among other shapes. The cam extension portion 162 can be configured to contact the switch 160. The cam extension portion 162 can include one or more surfaces.

FIG. 5F illustrates an example configuration of the hinge assembly 150 when the charging case assembly 100 is in the closed position. In the closed position, at least a portion, such as an end portion, of the switch 160 can rest and/or be supported on an end portion of the cam extension portion 162. In some implementations, at least a portion of the switch 160, such as the end portion of the switch 160, can be positioned below at least a portion of the cam extension portion 162. In the closed position, the switch 160 can be angled relative to a top surface of the PCBA 185, such as at a downward angle. In some implementations, the cam extension portion 162 of the cam 156 can bias the switch 160 into the downward angle. The end portion of the extension portion 163 can contact a top surface of the switch 160 to bias the switch 160 downwardly in the closed position. In some implementations, the hinge assembly 150 can include a biasing member to bias the switch 160 in the closed position.

The charging case assembly 100 can be opened by rotating the upper housing 102 relative to the lower housing 104 (or vice versa) about the axis of rotation. As the upper housing 102 rotates, the cam 156 and cam rod 158 can rotate in a first direction, such as a counter-clockwise direction. As the cam extension portion 162 of the cam 156 rotates away from the switch 160, the switch 160 rotates in an opposite direction. For example, the switch 160 can rotate about a switch axis of rotation in a second direction, opposite the first direction, such as a clockwise direction. The end portion of the switch 160 can slide along an outer surface of the cam 156, such as at least a portion of the cam extension portion 162, such as a bottom surface.

FIG. 5E illustrates an example configuration of the charging case assembly 100 in the opened position. In the opened position, the end portion of the switch 160 can contact the main body portion 161 of the cam 156. The switch 160 can be positioned approximately parallel relative to the PCBA 185 in the opened position. In some implementations, in the opened position, the switch 160 can be positioned at an angle relative to the surface of the PCBA 185 that is less than the angle of the switch 160 relative to the surface of the PCBA 185 in the closed position.

In some implementations, biasing the switch 160 towards the opened position can desirably provide a frictional hinge. In some implementations, biasing the switch 160 towards the opened position can desirably provide a friction-feel to the user as the user opens and/or closes the charging case assembly 100. For example, the hinge assembly 150 can enhance the durability of the charging case assembly 100 such that the charging case assembly 100 can be opened and closed a large number of times without failure. The hinge assembly 150 can desirably provide sufficient rigidity such that the case assembly may not be easily breakable when the charging case assembly 100 is in the opened position and/or the closed position.

When the charging case assembly 100 is in the opened position and/or the closed position, the switch 160 can activate an illuminating indicator 186. The illuminating indicator 186 can flash, change colors, and/or brighten, or provide other indications that the charging case assembly 100 is in the closed position.

FIG. 5G illustrates a schematic of a hinge assembly 150 consistent with implementations of the current subject matter. The hinge assembly 150 illustrated in FIG. 5G can include the same or similar properties to the other hinge assemblies described herein. The hinge assembly 150 can be used with and/or instead of the other hinge assemblies described herein. The hinge assembly 150 can include a wireform assembly 168. The wireform assembly 168 can include a hinge portion 168A, a friction element 168B, and/one or more magnets 168C. The wireform assembly 168 can desirably create bi-stable open and closed positions. For example, the wireform assembly 168 can help allow the charging case assembly 100 to be held in the opened and/or closed positions, such as in tension. The friction element 168B can include a compliant material, such as silicone and/or thermoplastic polyurethane (TPU), among other materials. The friction element 168B can define a roller that can interact with the cam 156 to open and close the upper housing 102 and/or the lower housing 104.

Figure 5H:
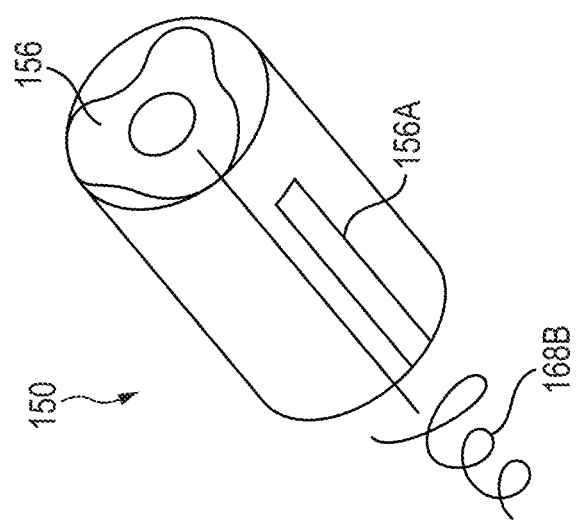
FIG. 5H illustrates a schematic of a hinge assembly for a charging case assembly for a vaporizer device consistent with implementations of the current subject matter.
Figure 7B:
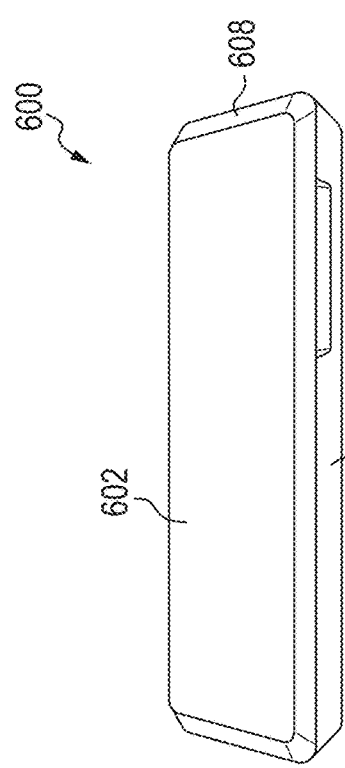
FIGS. 7A-7F illustrate a charging case assembly for a vaporizer device in a closed position consistent with implementations of the current subject matter.
Figure 7D:
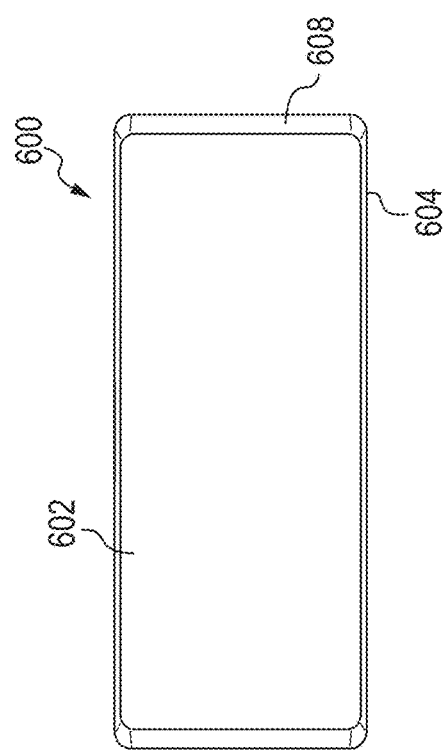
Figure 7A:
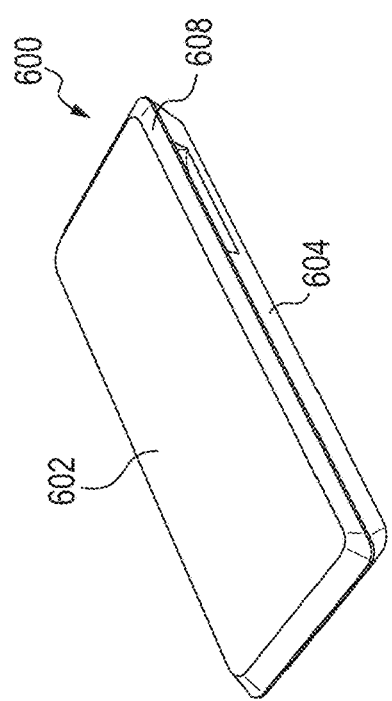
Figure 7C:
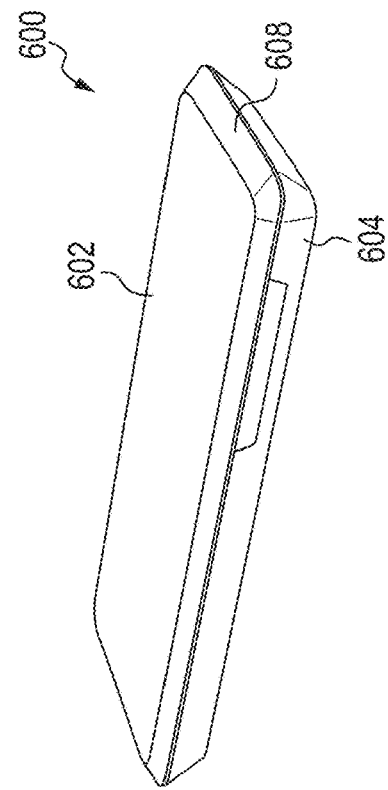
Figure 7F:
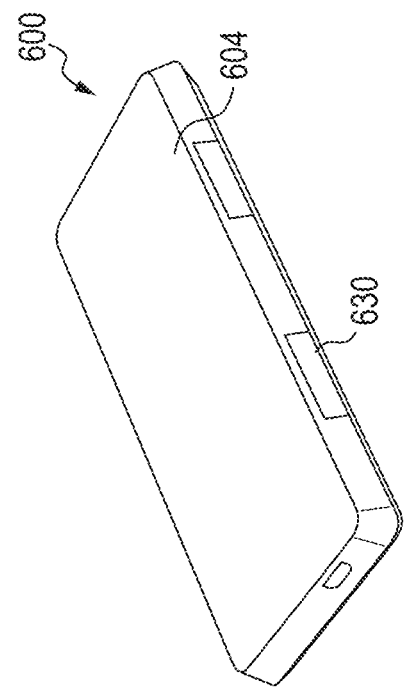
Figure 7E:
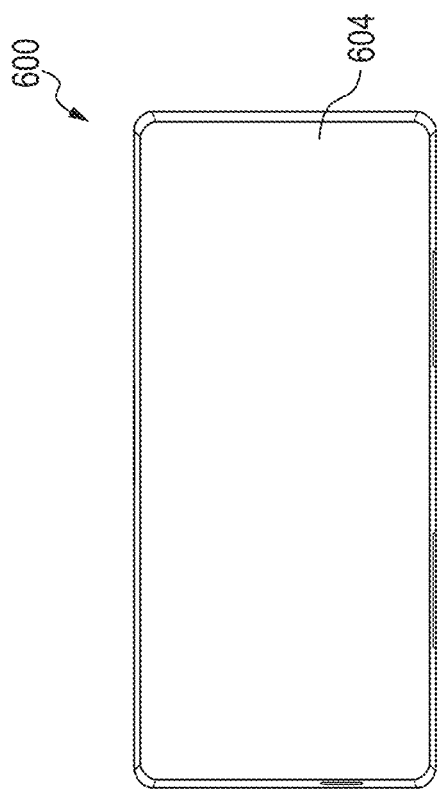
Figure 8B:
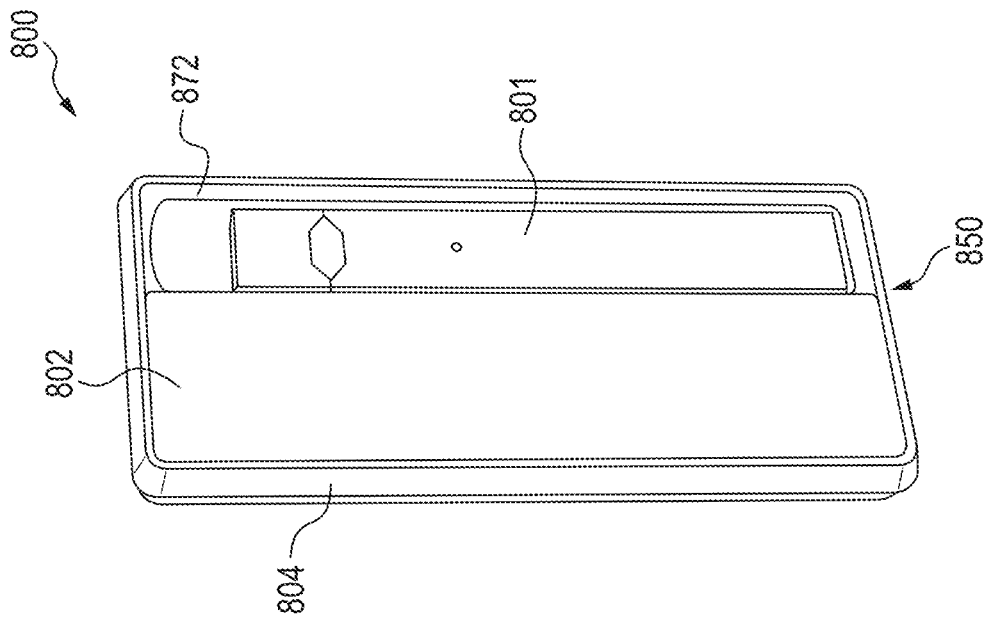
FIGS. 8A-8G illustrate a charging case assembly for a vaporizer device consistent with implementations of the current subject matter.
Figure 8A:
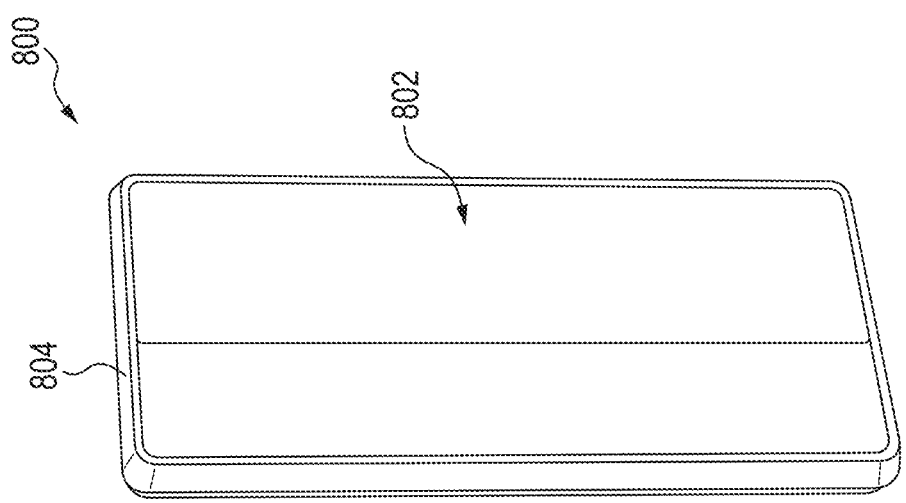
Figure 8D:
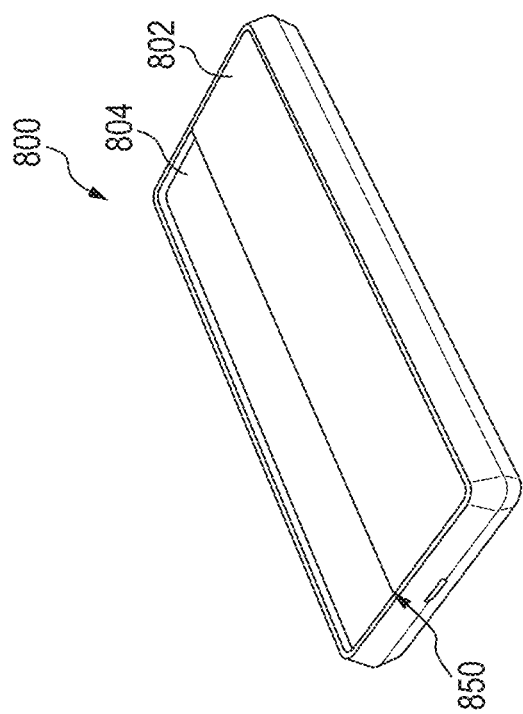
Figure 8C:
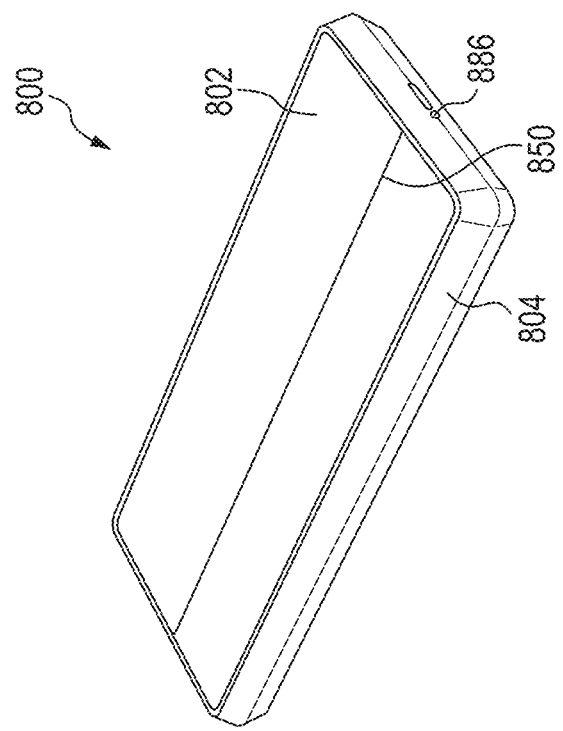
Figure 8F:
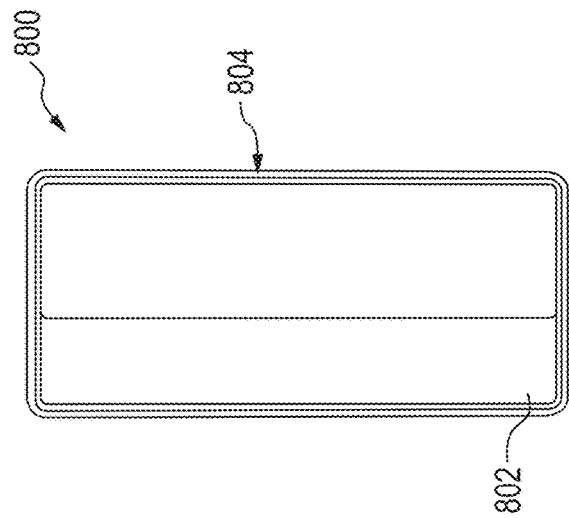
Figure 8G:
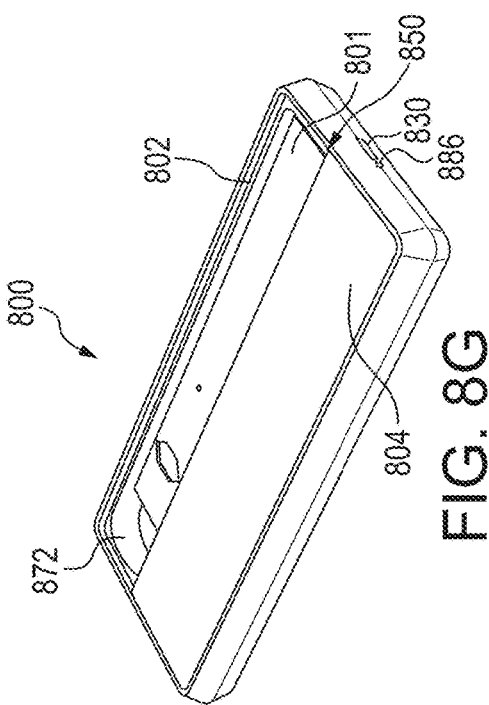
Figure 8E:
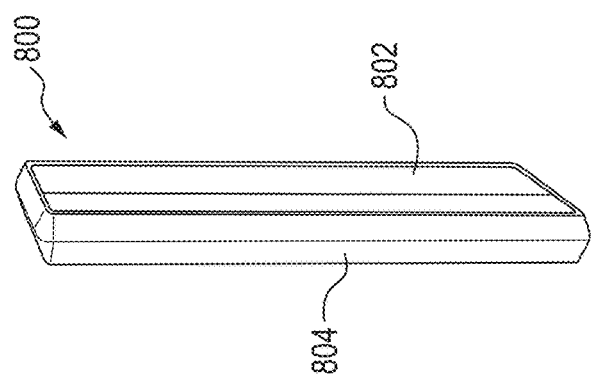
Figure 9B:
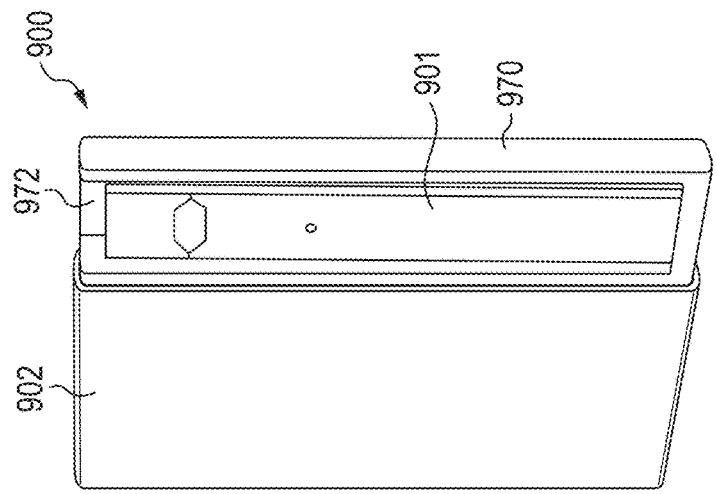
FIGS. 9A-9F illustrate a charging case assembly for a vaporizer device in a closed position consistent with implementations of the current subject matter.
Figure 9C:
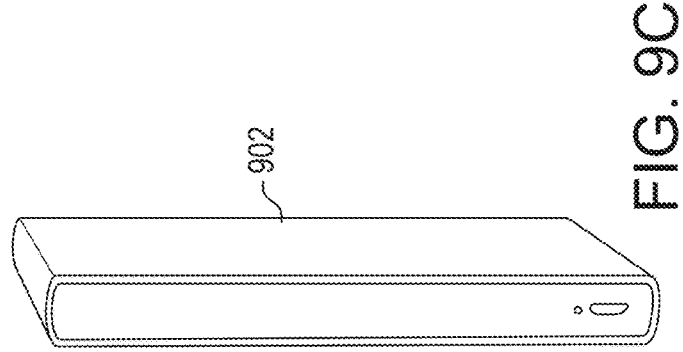
Figure 9A:
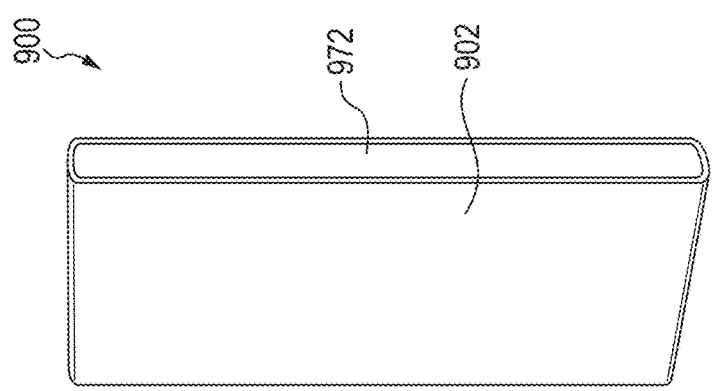
Figure 9E:
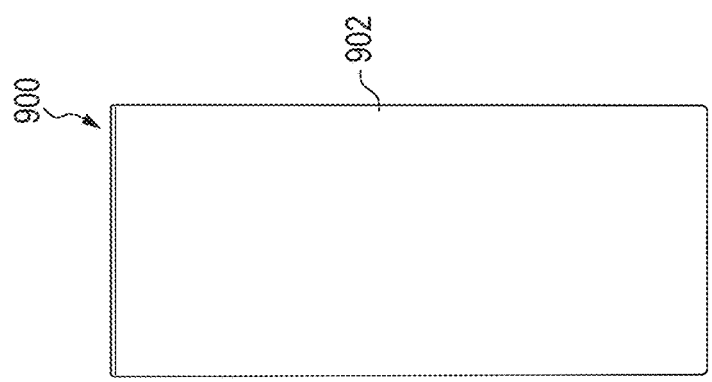
Figure 9F:
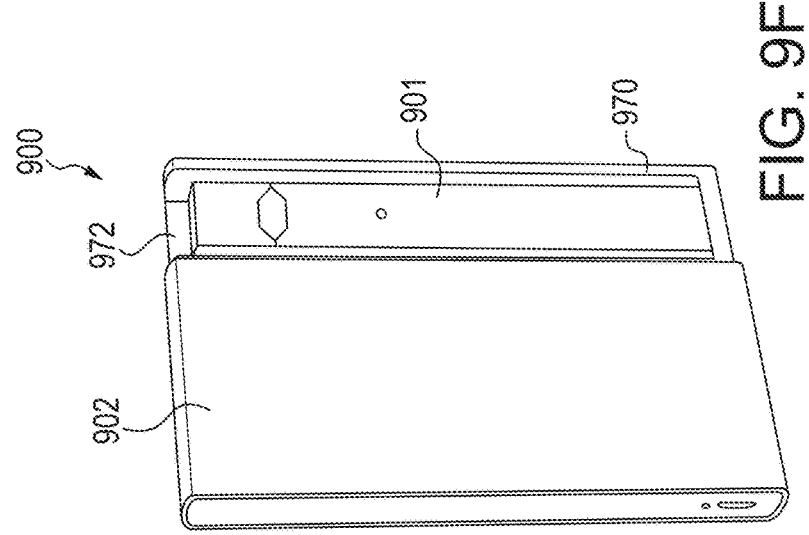
Figure 9D:
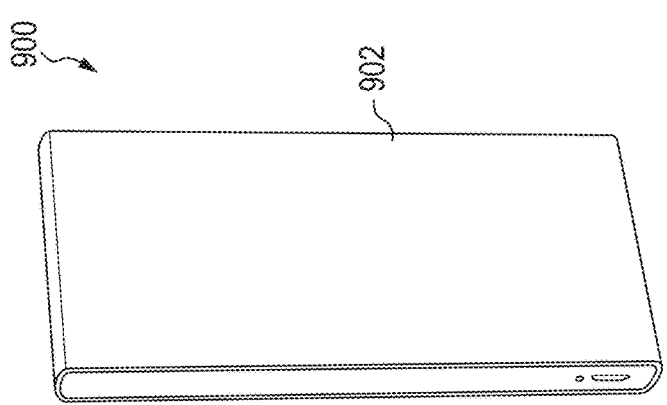
Figure 10B:
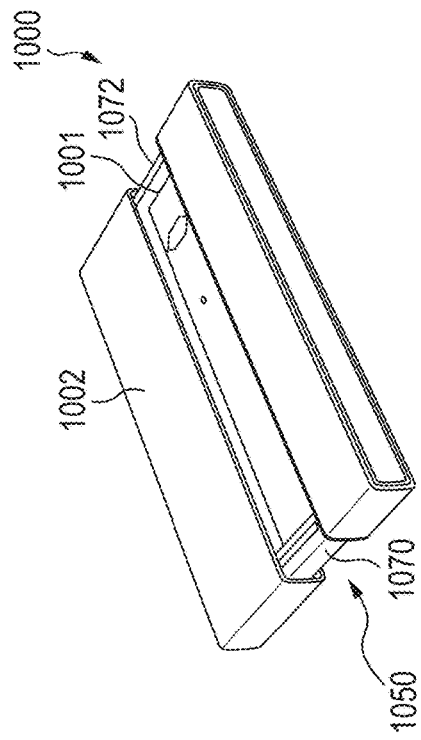
FIGS. 10A-10F illustrate a charging case assembly for a vaporizer device in a closed position consistent with implementations of the current subject matter.
Figure 10D:
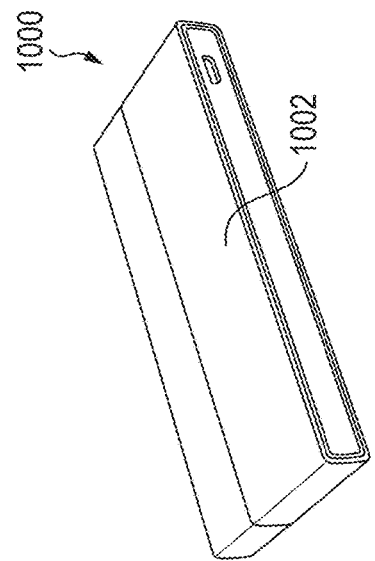
Figure 10A:
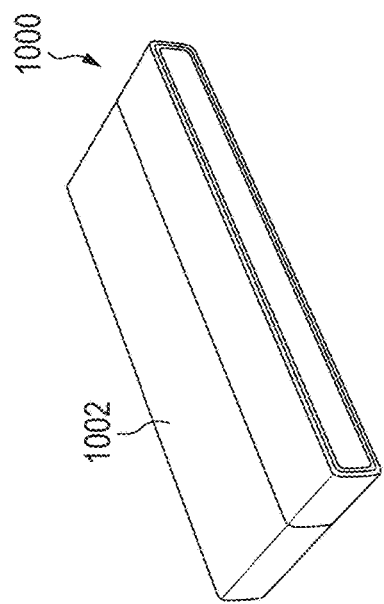
Figure 10C:
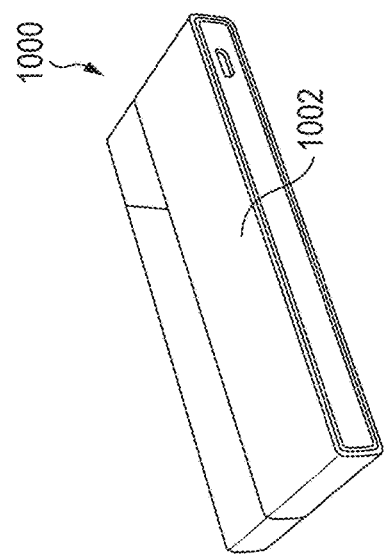
Figure 10F:
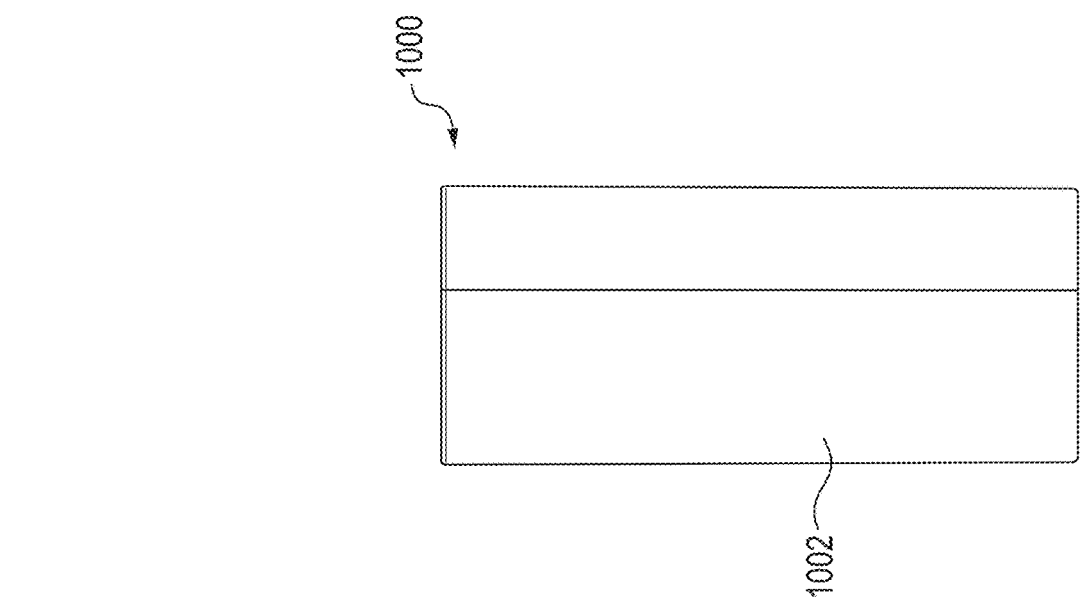
Figure 10E:
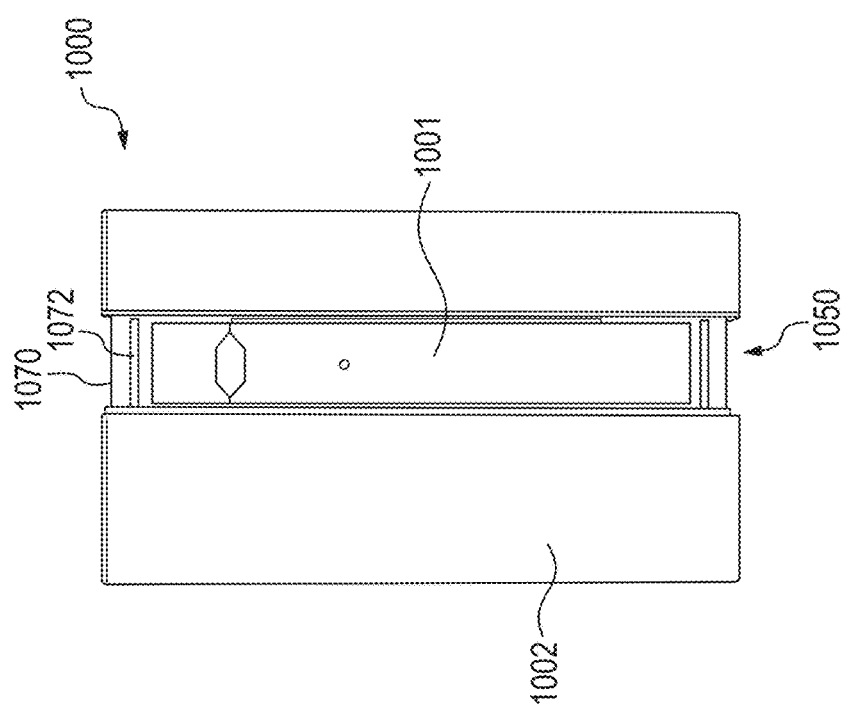
Figure 11C:
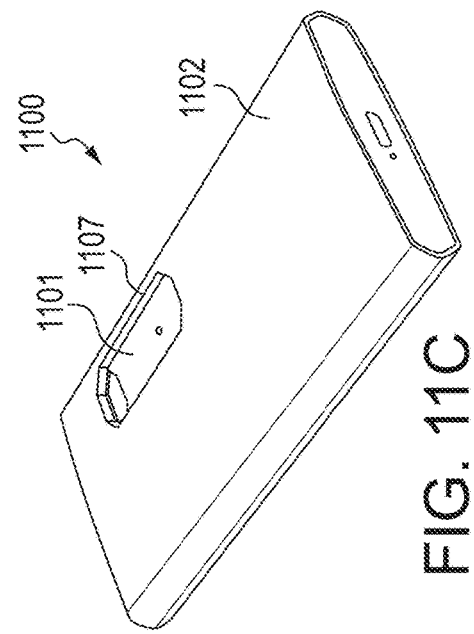
FIGS. 11A-11F illustrate a charging case assembly for a vaporizer device in a closed position consistent with implementations of the current subject matter.
Figure 11B:
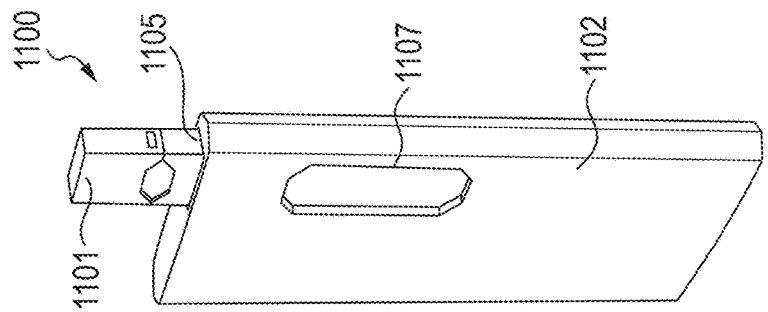
Figure 11A:
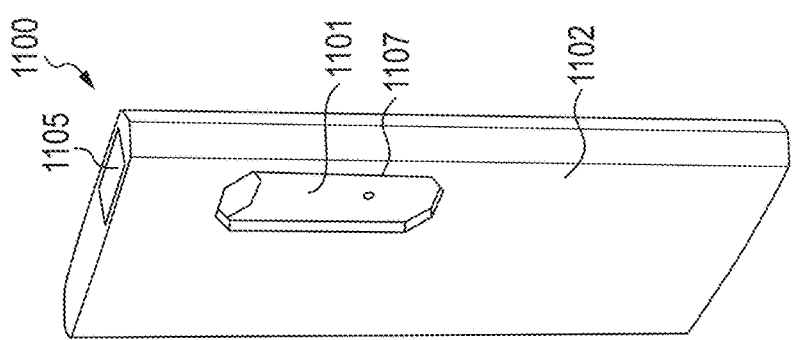
Figure 11F:
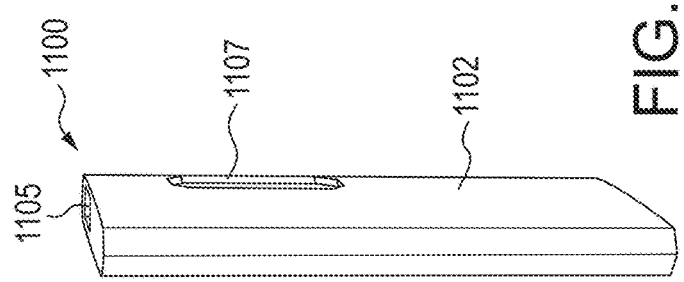
Figure 11D:
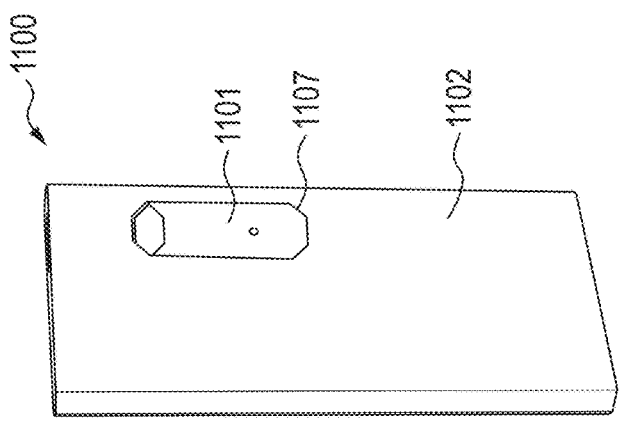
Figure 11E:
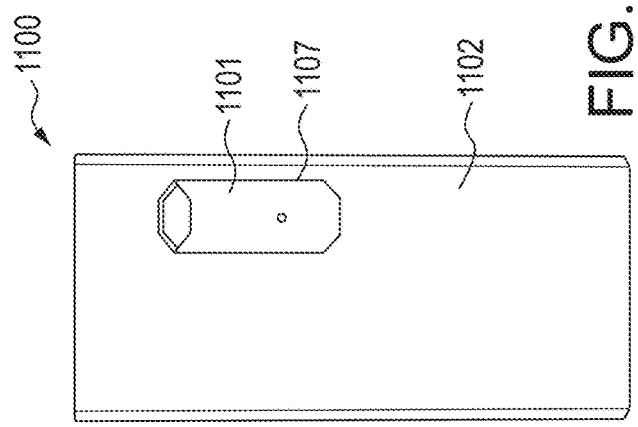

FIG. 5H illustrates a schematic of a hinge assembly 150 consistent with implementations of the current subject matter. The hinge assembly 150 illustrated in FIG. 5H can include the same or similar properties to the other hinge assemblies described herein. The hinge assembly 150 can be used with and/or instead of the other hinge assemblies described herein. The hinge assembly 150 can include a secondary cam, such as a spline-locked longitudinal cam 156A. The spline-locked longitudinal cam 156A can be stationary. In some implementations, the spline-locked longitudinal cam 156A can ride on a corresponding cam, such as the cam 156, to create bi-stable open and closed positions. The hinge assembly 150 can include a friction element 168B. The friction element 168B can include a compliant material, such as silicone and/or TPU, among other materials. The friction element 168B can define a roller that can interact with one or more of the cam 156 and the spline-locked longitudinal cam 156A to open and close the upper housing 102 and/or the lower housing 104. In some implementations, the charging case assembly 100 may not need one or more magnets to secure the charging case assembly 100 in the closed position.

FIGS. 5I and 5J illustrate schematics of hinge assembly 150 consistent with implementations of the current subject matter. The hinge assemblies 150 illustrated in FIGS. 5I and 5J can include the same or similar properties to the other hinge assemblies described herein. The hinge assembly 150 can be used with and/or instead of the other hinge assemblies described herein. In some implementations, the hinge assembly 150 can include one or more magnets 169. The magnets 169 can be positioned in a recess 169A within the upper housing 102. The recess 169A can be positioned near the side portion of the upper housing 102. The recess 169A can be positioned near the closing side of the upper housing 102. The recess can be configured to be positioned above at least a portion of a side surface of the frame 170 positioned on one side of the battery cover portion of the frame 170. The magnets 169 can be configured to be magnetically coupled with one or more corresponding magnets 169B and/or magnetic material positioned within and/or under the frame when assembled. The magnetic connection between the magnets 169 and the magnets 169B can help to secure the upper housing 102 to the lower housing 104, at least at the hinge side of the housing.

In some implementations, one or more of the magnets 169, 169B can have a magnetic force of approximately 235.5 Gauss, 276 Gauss, magnetic forces between 235.5 Gauss and 276 Gauss, and/or magnetic forces above 276 Gauss and/or below 235.5 Gauss.

FIGS. 6A-6D illustrate an exemplary vaporizer charging case system. The vaporizer charging case system can include a charging case assembly 600 and a vaporizer device 601. FIGS. 6A-6D illustrate the charging case assembly 600 in an open position, consistent with implementations of the current subject matter. FIGS. 7A-7D illustrate the charging case assembly 600 in the closed position, consistent with implementations of the current subject matter. The charging case assembly 600 can be the same as or similar to the charging case assembly 100 and other examples of charging case assemblies described herein. The charging case assembly 600 can include the same or similar components to the components of the charging case assemblies described herein. For example, the charging case assembly 600 can include an upper housing 602, a lower housing 604, a frame 670, and/or a hinge assembly 630, which can be the same as or similar to the upper housing 102, the lower housing 104, the frame 170, and/or the hinge assembly 150, respectively.

In some implementations, the upper housing 602 can include a grip portion 608. The grip portion 608 can be positioned along at least a portion of an outer surface of the upper housing 602. The grip portion 608 can be positioned near one side of the outer surface of the upper housing 602. The grip portion 608 can extend along a length of the upper housing 602 such as adjacent a closing side 631 of the upper housing 602. The grip portion 608 can desirably provide a gripping surface that allows the user to more easily grasp the charging case assembly 600. The grip portion 608 can help to limit the charging case assembly 600 from slipping out of the user's hand in use. The grip portion 608 can form a surface that is coupled with the upper housing 602. In some implementations, the grip portion 608 is integrally formed with the upper housing 602. In some implementations, the upper housing 602 may not include the grip portion 608. In some implementations, the grip portion 608 has an enhanced appearance, such that the grip portion 608 enhances the aesthetics of the charging case assembly 600.

As shown in at least FIGS. 6A-6C, the vaporizer device 601 can be positioned within the vaporizer device slot 672 of the frame 670. In some implementations, the vaporizer device slot 672 is sized and shaped such that the vaporizer device 601 may not occupy an entire volume of the vaporizer device slot 672. Such configurations can allow the vaporizer device 601 to be placed within and/or removed from the vaporizer device slot 672 and/or electronically coupled with the case charging contacts 674. In some implementations, the vaporizer device slot 672 is sized and/or shaped such that the vaporizer device 601 occupies an entire volume of the vaporizer device slot 672 when assembled. For example, the charging case assembly 600 can include a cradle portion (e.g., vaporizer device slot 672) positioned along the lower housing 604 which can include an elongated base that is recessed along an inner surface of the lower housing 604, such that the cradle portion can be configured to receive the vaporizer device 601.

The vaporizer device 601 can include at least a first elongated side 690. When the vaporizer device 601 is coupled with the charging case assembly 600, the first elongated side 690 may be positioned against the base 107 of the cradle portion (e.g., vaporizer device slot 672) of the charging case assembly). The vaporizer device 601 can include one or more device charging contacts 684 configured to align with and electrically couple to the case charging contacts 674. The device charging contacts 684 can be positioned adjacent to a charging end 692 of the vaporizer device 601. The first elongated side 690 may be adjacent to the charging end 692 of the vaporizer device 601 and configured to be positioned against the base 107 of the cradle portion (e.g., vaporizer device slot 672) such that the first elongated side 690 aligns with the vaporizer device slot 672 and the device charging contacts 684 align with the case charging contacts 674. As shown in FIGS. 6A-6C, the vaporizer device 601 can include at least one illuminating indicator 687, such as an LED or other light source, positioned along a surface of the vaporizer device 601, such as shown in FIG. 6A. The illuminating indicator 687 can be activated (e.g., illuminate an LED) in a variety of manners (e.g., blinking LED, etc.) to indicate one or more of a charging state (e.g., charged or charging) or a charging level (e.g., 50% charged, etc.) of the vaporizer device 801.

Additionally, as shown FIGS. 6A-6C, the charging case assembly 600 can include at least one illuminating indicator 686, such as an LED or other light source, positioned along a top surface of the lower housing 604. Other positions along the charging case assembly 600 for placing one or more illuminating indicators 686 are also within the scope of this disclosure. For example, in some implementations, four illuminating indicators 686 are positioned in a linear configuration along a power supply cover of the lower housing 604, as shown in FIG. 6A. The illuminating indicators 886 can include a variety of indication configurations to indicate a charging state (e.g., charged or charging), a charging level of the charging case assembly 600 and/or the vaporizer device 601, and/or whether the charging case assembly 600 is in the opened or the closed position, among other indications. For example, when a user taps or shakes the charging case assembly 600, one or more illuminating indicators 686, 687 can be illuminated to indicate a charging state or charging level of the charging case assembly 600. For example, the charging case assembly 600 can include an accelerometer that detects and measures an acceleration or movement of the charging case assembly 600. The accelerometer can be in communication with the microprocessor of the charging case assembly 600 such that when the accelerometer detects movement or a threshold amount of acceleration, the microprocessor activates the one or more illuminating indicators 686, 687 in accordance with either a charging state or charging level of the charging case assembly 600.

As an example, if the charging case assembly 600 is plugged into a power source and is charging and/or a user shakes or taps the charging case assembly 600 to thereby activate the accelerometer, the microprocessor can activate one illuminating indicator 686 for every 25% battery charge of the charging case assembly 600. As such, if the case assembly has a 50% charge, two illuminating indicators 686 can be illuminated. In some embodiments, any remaining illuminating indicators 686 can turn on and off (e.g., blink) to indicate to a user that the charging case assembly 600 is charging. If the case assembly is fully charged, then all the illuminating indicators 686 can be activated. Such activation of any of the illuminating indicators 686, 687 can be for a predefined duration (e.g., approximately 2 seconds to approximately 15 seconds) before the illuminating indicators 686 are deactivated. Activation of the illuminating indicators 686, 687 for such a short duration preserves power and prevents from draining the battery or prolonging charging of the battery.

The upper housing 602 can be made out of a translucent material thereby allowing a user to see the illuminating indicators 686, such as one or more activated illuminating indicators 686 positioned along either the charging case assembly 600 or the vaporizer device 601. This can allow a user to simply shake or tap on the charging case assembly 600 without having to open the charging case assembly 600 to see the charging state or charging level of either the charging case assembly 600 or vaporizer device 601. In some embodiments, the charging case assembly 600 can include a switch that is activated upon opening the case assembly (e.g., pivoting the upper housing 602 relative to the lower hosing 604). Activation of the switch can result in some or all of the above-mentioned activation of one or more illuminating indicators 686, 687 to thereby inform a user of either the charging state or charging level of the charging case assembly 600 or vaporizer device 601. In some embodiments, the case assembly can include a microprocessor having or implementing logic such that when the charging case assembly 600 is plugged into a power source, the charging case assembly 600 can (as a result of being plugged into the power source) perform some or all of the above mentioned activating of one or more illuminating indicators to thereby inform a user of either the charging state or charging level of either the charging case assembly 600 or vaporizer device 601.

In some implementations, the illuminating indicators 686, 687 can illustrate an error or fault state to indicate when there is an error reading, such as a power connection issue, a battery failure, over-heating of the charging case assembly 600 or vaporizer device 601, or other errors associated with the charging case assembly 600 and/or vaporizer device 601. For example, in the error state, all of the illuminating indicators 686, 687 can indicate that there is an error, such as by flashing a predetermined number of times and/or in a predetermined color.

An example method associated with charging a vaporizer device using a charging case assembly consistent with one or more implementations described herein includes coupling the vaporizer device to a cradle portion of a lower housing of a charging case. The charging case can include an upper housing that is pivotably coupled to the lower housing for allowing the charging case to form an open configuration and a closed configuration. In addition, the method can include connecting a power source to at least one of a device battery associated with the vaporizer device and a case battery associated with the charging case. Furthermore, the method can include indicating at least one of a charging state and a charging level of the vaporizer device or the charging case. The indicating can include illuminating at least one indicator associated with the charging case or vaporizer device, and the at least one illuminated indicator can be viewable through the upper housing by a user when the charging case is in the closed configuration.

FIGS. 8A-8G illustrate an exemplary vaporizer charging case system. The vaporizer charging case system can include a charging case assembly 800 for a vaporizer device 801 consistent with implementations of the current subject matter. The charging case assembly 800 can be the same or similar to the case assemblies described herein. The charging case assembly 800 can include one or more features that are the same or similar to the features of the case assemblies described herein. The charging case assembly 800 can include an upper housing 802. The upper housing 802 can be bi-stable. For example, the upper housing 802 can slide to one side (e.g., see FIG. 8B) to allow the vaporizer device slot 872 and/or the vaporizer device 801 to be accessed. The charging case assembly 800 can include a sliding hinge assembly 850 that allows the upper housing 802 to remain in the opened and/or a closed position. For example, the sliding hinge assembly 850 can allow the upper housing 802 to snap into an opened and/or a closed position. As shown in at least FIG. 8D, in some implementations, the charging case assembly 800 can include an illuminating indicator 886. The illuminating indicator 886 can include a variety of indication configurations to indicate one or more of a charging state, a charging level of the charging case assembly 800 and/or the vaporizer device 801, and/or whether the case assembly is in the opened or the closed position, among other indications. The illuminating indicator 886 can include a variety of indicators, such as an LED or other light source. The illuminating indicator 886 can change colors depending on the indication the illuminating indicator 886 is displaying. The indicator v can be positioned adjacent to or near the charging port 830, or other positions in the charging case assembly 800.

FIGS. 9A-9F illustrate an exemplary vaporizer charging case system. The vaporizer charging case system can include a charging case assembly 900 for a vaporizer device 901 in a closed position consistent with implementations of the current subject matter. The charging case assembly 900 can be the same or similar to the case assemblies described herein. The charging case assembly 900 can include one or more features that are the same or similar to the features of the case assemblies described herein. The charging case assembly 900 can include a push-push mechanism to allow users to open an interior frame 970. The interior frame 970 can include a vaporizer device slot 972 to secure the vaporizer device 901 and/or charge the vaporizer device 901 within the charging case assembly 900. The charging case assembly 900 can include an exterior frame 902 that surrounds all or a portion of the interior frame 970 in the closed position (e.g., see FIG. 9A). The push-push mechanism can allow the user to push the interior frame 970 into the exterior frame 902. When the user pushes the interior frame 970 into the exterior frame 902, the interior frame 970 can be pushed out of an opening in the exterior frame 902. When the user pushes the interior frame 970 into the exterior frame 902 a second time, the interior frame 970 can be locked into the closed position, such that all or a portion of the interior frame 970 is positioned within the exterior frame 902.

FIGS. 10A-10F illustrate an exemplary vaporizer charging case system. The vaporizer charging case system can include a charging case assembly 1000 for a vaporizer device 1001 consistent with implementations of the current subject matter. The charging case assembly 1000 can be the same or similar to the case assemblies described herein. The charging case assembly 1000 can include one or more features that are the same or similar to the features of the case assemblies described herein. The charging case assembly 1000 can include an exterior frame 1002 and/or an interior frame 1070. The interior frame 1070 can include a vaporizer device slot 1072 to secure the vaporizer device 1001 and/or charge the vaporizer device 1001 within the charging case assembly 1000. The exterior frame 1002 can surround all or a portion of the interior frame 1070 in the closed position (e.g., see FIG. 10A). The exterior frame 1002 and/or the interior frame 1070 can be bi-stable. For example, the interior frame 1070 and/or the exterior frame 1002 can slide to one side (e.g., see FIG. 10B) to allow the vaporizer device slot 1072 and/or the vaporizer device 1001 to be accessed. The charging case assembly 1000 can include a sliding hinge assembly 1050 that allows the exterior frame 1002 and/or the interior frame 1070 to remain in an opened and/or a closed position. For example, the sliding hinge assembly 1050 can allow the exterior frame 1002 and/or the interior frame 1070 to snap into an opened and/or a closed position.

FIGS. 11A-11F illustrate an exemplary vaporizer charging case system. The vaporizer charging case system can include a charging case assembly 1100 for a vaporizer device 1101 consistent with implementations of the current subject matter. The charging case assembly 1100 can be the same or similar to the case assemblies described herein. The charging case assembly 1100 can include one or more features that are the same or similar to the features of the case assemblies described herein. In some implementations, the charging case assembly 1100 includes an outer housing 1102. In some implementations, the outer housing 1102 includes a vaporizer device opening 1105. The vaporizer device opening 1105 can receive the vaporizer device 1101. The vaporizer device 1101 can slide into and/or out of the outer housing 1102. The outer housing 1102 can include a cutout region 1107. The cutout region 1107 can allow at least a portion of the vaporizer device 1101 to be visible through the outer housing 1102 when the vaporizer device is at least partially secured within the outer housing 1102. In some implementations, the cutout region 1107 can allow an indicator, such as an LED or other light source, on the vaporizer device 1101 to be visible through the outer housing 1102. The cutout region 1107 can allow the user to touch the vaporizer device 1101 to slide the vaporizer device 1101 into and out of the vaporizer device opening 1105 more easily.

Terminology

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the teachings herein. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A charging case assembly for securing and charging a vaporizer device, the charging case assembly comprising:
   an upper housing; and
   a lower housing pivotably coupled to the upper housing, the lower housing comprising:
      a rechargeable power supply configured to be recharged and to provide power to the vaporizer device; and
      a coupling mechanism configured to receive and position the vaporizer device within the lower housing, the coupling mechanism comprising:
         a cradle portion positioned along the lower housing and comprising an elongated base that is recessed along an inner surface of the lower housing, the cradle portion being configured to receive the vaporizer device such that a first elongated side of the vaporizer device is positioned against the elongated base of the cradle portion and a second elongated side of the vaporizer device is exposed and facing away from the lower housing, the second elongated side opposing the first elongated side and extending between a mouthpiece and a charging end of the vaporizer device;
         a pair of case contacts positioned adjacent a first end of the elongated base, the pair of case contacts in electrical communication with the rechargeable power supply and positioned to contact a pair of vaporizer contacts of the vaporizer device for charging the vaporizer device; and
         a first magnet positioned along the first end of the elongated base for magnetically coupling with a second magnet associated with the vaporizer device, the first magnet magnetically coupling with the second magnet to secure the first elongated side of the vaporizer device against the elongated base and the charging end of the vaporizer device against the first end of the elongated base thereby securing contact between the pair of case contacts and the pair of vaporizer contacts.

2. The charging case assembly of claim 1, wherein the elongated base is recessed a first distance from the inner surface of the lower housing, and wherein the first distance is approximately equivalent to a thickness of the vaporizer device.

3. The charging case assembly of claim 1, wherein the cradle portion includes a pair of elongated sidewalls extending approximately parallel to each other along opposing sides of the elongated base and a pair of end walls extending between the pair of elongated sidewalls, and wherein the pair of case contacts are positioned along a first end wall of the pair of end walls.

4. The charging case assembly of claim 3, wherein the pair of elongated sidewalls are positioned a second distance apart, and wherein the second distance is approximately equivalent to a width of the vaporizer device.

5. The charging case assembly of claim 4, wherein the second distance is sized to allow a sliding fit between the vaporizer device and the pair of elongated sidewalls.

6. The charging case assembly of claim 1, wherein the coupling mechanism is configured to receive the vaporizer device in more than one orientation.

7. The charging case assembly of claim 1, wherein the upper housing and the lower housing are pivotably coupled by a hinge assembly that allows the charging case assembly to form an open configuration where the upper housing is pivoted away from the lower housing and a closed configuration where the upper housing is pivoted towards the lower housing.

8. The charging case assembly of claim 7, wherein at least one of the upper housing and the lower housing comprises a transparent material allowing visualization of an illuminating device indicator along the vaporizer device when the illuminating device indicator is illuminated and the charging case assembly is in the closed configuration.

9. The charging case assembly of claim 7, wherein the inner surface of the lower housing includes at least one illuminating case indicator for indicating one or more of a charging level and a charging state of either the charging case assembly or the vaporizer device.

10. The charging case assembly of claim 9, wherein at least one of the upper housing and the lower housing comprises a transparent material allowing visualization of the at least one illuminating case indicator when illuminated and the charging case assembly is in the closed configuration.

11. The charging case assembly of claim 9, wherein the lower housing further comprises a switch configured to activate one or more of the at least one illuminating case indicator when the charging case assembly is moved between the closed configuration and the open configuration.

12. A method of charging a vaporizer device, comprising:
receiving the vaporizer device in a coupling mechanism of a charging case assembly, the charging case assembly having an upper housing that is pivotably coupled to a lower housing for allowing the charging case assembly to transition between an open configuration and a closed configuration, the coupling mechanism comprising:
a cradle portion positioned along the lower housing and comprising an elongated base that is recessed along an inner surface of the lower housing, the cradle portion being configured to receive the vaporizer device such that a first elongated side of the vaporizer device is positioned against the elongated base of the cradle portion and a second elongated side of the vaporizer device is exposed and facing away from the lower housing, the second elongated side opposing the first elongated side and extending between a mouthpiece and a charging end of the vaporizer device;
a pair of case contacts positioned adjacent a first end of the elongated base, the pair of case contacts in electrical communication with a rechargeable power supply and positioned to contact a pair of vaporizer contacts of the vaporizer device for charging the vaporizer device; and
a first magnet positioned along the first end of the elongated base for magnetically coupling with a second magnet associated with the vaporizer device; and magnetically coupling the first magnet associated with the lower housing with the second magnet associated with the vaporizer device to secure the first elongated side of the vaporizer device against the elongated base and the charging end of the vaporizer device against the first end of the elongated base thereby securing contact between the pair of case contacts and the pair of vaporizer contacts of the vaporizer device.

13. The method of claim 12, further comprising indicating at least one of a charging state and a charging level of the vaporizer device or the charging case assembly, wherein the indicating includes illuminating at least one illuminated indicator associated with the charging case assembly or the vaporizer device, the at least one illuminated indicator being viewable through the upper housing by a user when the charging case assembly is in the closed configuration.

14. The method of claim 13, wherein one or more illuminated indicators of the at least one illuminated indicator is positioned along the inner surface of the lower housing such that the one or more illuminated indicators are contained within the charging case assembly when the charging case assembly is in the closed configuration.

15. The method of claim 13, wherein one or more illuminated indicators of the at least one illuminated indicator is positioned along the vaporizer device such that the one or more illuminated indicators are contained within the charging case assembly when the vaporizer device is positioned within the cradle portion and the charging case assembly is in the closed configuration.

16. The method of claim 12, further comprising connecting a power source to at least one of a device battery associated with the vaporizer device and the rechargeable power supply associated with the charging case assembly.

17. The method of claim 12, wherein the magnetic coupling of the first magnet with the second magnet includes a magnetic force that secures the vaporizer device in the cradle portion of the coupling mechanism.

18. A vaporizer charging case system, comprising:
a vaporizer device including a first elongated side and a second elongated side opposing the first elongated side, the first and second elongated sides extending between a mouthpiece and a charging end of the vaporizer device, the charging end including a pair of vaporizer contacts;
a charging case assembly comprising:
an upper housing; and
a lower housing pivotably coupled to the upper housing, the lower housing comprising:
a rechargeable power supply configured to be recharged and to provide power to the vaporizer device; and
a coupling mechanism configured to receive and position the vaporizer device within the lower housing, the coupling mechanism comprising:
a cradle portion positioned along the lower housing and comprising an elongated base that is recessed along an inner surface of the lower housing, the cradle portion being configured to receive the vaporizer device such that a first elongated side of the vaporizer device is positioned against the elongated base of the cradle portion and the second elongated side of the vaporizer device is exposed and facing away from the lower housing;
a pair of case contacts positioned adjacent a first end of the elongated base, the pair of case contacts in electrical communication with the rechargeable power supply and positioned to contact the pair of vaporizer contacts for charging the vaporizer device; and a first magnet positioned along the first end of the elongated base for magnetically coupling with a second magnet associated with the vaporizer device, the first magnet magnetically coupling with the second magnet to secure the first elongated side of the vaporizer device against the elongated based and the charging end of the vaporizer device against the first end of the elongated base thereby securing contact between the pair of case contacts and the pair of vaporizer contacts.

19. The vaporizer charging case system of claim 18, wherein the elongated base is recessed a first distance from the inner surface of the lower housing, and wherein the first distance is approximately equivalent to a thickness of the vaporizer device.

20. The vaporizer charging case system of claim 18, wherein the cradle portion includes a pair of elongated sidewalls extending approximately parallel to each other along opposing sides of the elongated base and a pair of end walls extending between the pair of elongated sidewalls, and wherein the pair of case contacts are positioned along a first end wall of the pair of end walls.

21. The vaporizer charging case system of claim 20, wherein the pair of elongated sidewalls are positioned a second distance apart, and wherein the second distance is approximately equivalent to a width of the vaporizer device.

22. The vaporizer charging case system of claim 21, wherein the second distance is sized to allow a sliding fit between the vaporizer device and the pair of elongated sidewalls.

23. The vaporizer charging case system of claim 18, wherein the coupling mechanism is configured to receive the vaporizer device in more than one orientation.

24. The vaporizer charging case system of claim 18, wherein the upper housing and the lower housing are pivotably coupled by a hinge assembly that allows the charging case assembly to form an open configuration where the upper housing is pivoted away from the lower housing and a closed configuration where the upper housing is pivoted towards the lower housing.

25. The vaporizer charging case system of claim 24, wherein at least one of the upper housing and the lower housing comprises a transparent material allowing visualization of an illuminating device indicator along the vaporizer device when the illuminating device indicator is illuminated and the charging case assembly is in the closed configuration.

26. The vaporizer charging case system of claim 24, wherein the inner surface of the lower housing includes at least one illuminating case indicator for indicating one or more of a charging level and a charging state of either the charging case assembly or the vaporizer device.

27. The vaporizer charging case system of claim 26, wherein at least one of the upper housing and the lower housing comprises a transparent material allowing visualization of the at least one illuminating case indicator when illuminated and the charging case assembly is in the closed configuration.

28. The vaporizer charging case system of claim 26, wherein the lower housing further comprises a switch configured to activate one or more of the at least one illuminating case indicator when the charging case assembly transitions between the closed configuration and the open configuration.

* * * * *